(12) United States Patent
Ingole et al.

(10) Patent No.: US 10,167,156 B2
(45) Date of Patent: Jan. 1, 2019

(54) VACUUM COMMUTATION APPARATUS AND METHODS

(71) Applicant: CURT G. JOA, INC., Sheboygan Falls, WI (US)

(72) Inventors: Sudeep Ingole, Sheboygan, WI (US); Jon Allen Pelland, Sheboygan, WI (US)

(73) Assignee: Curt G. Joa, Inc., Sheboygan Falls, WI (US)

( * ) Notice: Subject to any disclaimer, the term of this patent is extended or adjusted under 35 U.S.C. 154(b) by 258 days.

(21) Appl. No.: 15/217,677

(22) Filed: Jul. 22, 2016

(65) Prior Publication Data

US 2017/0020741 A1    Jan. 26, 2017

Related U.S. Application Data

(60) Provisional application No. 62/196,736, filed on Jul. 24, 2015, provisional application No. 62/248,155, filed on Oct. 29, 2015.

(51) Int. Cl.
*B65H 20/12* (2006.01)
*B65G 39/02* (2006.01)
(Continued)

(52) U.S. Cl.
CPC ............ *B65H 20/12* (2013.01); *B65G 29/02* (2013.01); *B65G 39/02* (2013.01); *B65G 47/848* (2013.01);
(Continued)

(58) Field of Classification Search
CPC .. B65G 15/58; B65G 17/323; B65G 21/2027; B65G 21/2036; B65G 23/19;
(Continued)

(56) References Cited

U.S. PATENT DOCUMENTS 135,145 A    1/1873  Murphy
293,353 A    2/1884  Purvis
(Continued)

FOREIGN PATENT DOCUMENTS

BE    1007854    11/1995
CA    1146129    5/1983
(Continued)

OTHER PUBLICATIONS

European Search Report, related to EP patent application No. 14178233, dated Nov. 11, 2014, 7 pages.
(Continued)

*Primary Examiner* — Gene O Crawford
*Assistant Examiner* — Keith R Campbell
(74) *Attorney, Agent, or Firm* — Ryan Kromholz & Manion, S.C.

(57) ABSTRACT

The present invention provides a method and apparatus for transporting a discrete element. A preferably rotatably driven vacuum commutation zone (or internal vacuum manifold), preferably internal to a preferably independently driven porous vacuum roll or drum is disclosed. The vacuum manifold applies vacuum through pores in the driven porous vacuum roll or puck in order to hold material against an external surface of the vacuum roll or puck. By independently controlling the vacuum commutation zone and the driven porous surface, unique motion profiles of the vacuum commutation zone relative to the driven porous surface can be provided. Micro vacuum commutation port structures are also disclosed.

4 Claims, 11 Drawing Sheets

(51) Int. Cl.
*B65G 29/02* (2006.01)
*B65G 47/91* (2006.01)
*B65G 47/84* (2006.01)
*B65H 39/14* (2006.01)

(52) U.S. Cl.
CPC ............ *B65G 47/915* (2013.01); *B65H 39/14* (2013.01); *B65H 2406/361* (2013.01); *B65H 2801/57* (2013.01)

(58) Field of Classification Search
CPC ........ B65G 29/00; B65G 29/02; B65G 39/02; B65G 47/843; B65G 47/848; B65G 47/915; B65H 3/10; B65H 5/226; B65H 20/12; B65H 27/00; B65H 29/243; B65H 39/14; B65H 2404/1362; B65H 2404/1363; B65H 2406/33; B65H 2406/332; B65H 2406/36; B65H 2406/361; B65H 2406/3614; B65H 2406/362; B65H 2406/3622; B65H 2406/363; B65H 2801/57
See application file for complete search history.

(56) References Cited

U.S. PATENT DOCUMENTS

| | | | |
|---|---|---|---|
| 312,257 | A | 2/1885 | Cotton et al. |
| 410,123 | A | 8/1889 | Stilwell |
| 432,742 | A | 7/1890 | Stanley |
| 643,821 | A | 2/1900 | Howlett |
| 1,393,524 | A | 10/1921 | Grupe |
| 1,431,315 | A | 10/1922 | Le Moine |
| 1,605,842 | A | 11/1926 | Jones |
| 1,686,595 | A | 10/1928 | Belluche |
| 1,957,651 | A | 5/1934 | Joa |
| 2,009,857 | A | 7/1935 | Potdevin |
| 2,054,832 | A | 9/1936 | Potdevin |
| 2,117,432 | A | 5/1938 | Linscott |
| 2,128,746 | A | 8/1938 | Joa |
| 2,131,808 | A | 10/1938 | Joa |
| 2,164,408 | A | 7/1939 | Joa |
| 2,167,179 | A | 7/1939 | Joa |
| 2,171,741 | A | 9/1939 | Cohn et al. |
| 2,213,431 | A | 9/1940 | Joa |
| 2,254,290 | A | 9/1941 | Joa |
| 2,254,291 | A | 9/1941 | Joa |
| 2,282,477 | A | 5/1942 | Joa |
| 2,286,096 | A | 6/1942 | Joa |
| 2,296,931 | A | 9/1942 | Joa |
| 2,304,571 | A | 12/1942 | Joa |
| 2,324,930 | A | 7/1943 | Joa |
| 2,345,937 | A | 4/1944 | Joa |
| 2,466,240 | A | 4/1949 | Joa |
| 2,481,929 | A | 9/1949 | Joa |
| 2,510,229 | A | 6/1950 | Joa |
| 2,540,844 | A | 2/1951 | Strauss |
| 2,584,002 | A | 1/1952 | Elser et al. |
| 2,591,359 | A | 4/1952 | Joa |
| 2,618,816 | A | 11/1952 | Joa |
| 2,627,859 | A | 2/1953 | Hargrave |
| 2,695,025 | A | 11/1954 | Andrews |
| 2,702,406 | A | 2/1955 | Reed |
| 2,721,554 | A | 10/1955 | Joa |
| 2,730,144 | A | 1/1956 | Joa |
| 2,772,611 | A | 12/1956 | Heywood |
| 2,780,253 | A | 2/1957 | Joa |
| 2,785,609 | A | 3/1957 | Billeb |
| 2,788,786 | A | 4/1957 | Dexter |
| 2,811,905 | A | 11/1957 | Kennedy, Jr. |
| 2,828,745 | A | 4/1958 | Deutz |
| 2,839,059 | A | 6/1958 | Joa |
| 2,842,169 | A | 7/1958 | Joa |
| 2,851,934 | A | 9/1958 | Heywood |
| 2,875,724 | A | 3/1959 | Joa |
| 2,890,700 | A | 6/1959 | Lonberg-Holm |
| 2,913,862 | A | 11/1959 | Sabee |
| 2,939,461 | A | 6/1960 | Joa |
| 2,939,646 | A | 6/1960 | Stone |
| 2,960,143 | A | 11/1960 | Joa |
| 2,990,081 | A | 6/1961 | De Neui et al. |
| 2,991,739 | A | 7/1961 | Joa |
| 3,016,207 | A | 1/1962 | Comstock, III |
| 3,016,582 | A | 1/1962 | Joa |
| 3,017,795 | A | 1/1962 | Joa |
| 3,020,687 | A | 2/1962 | Joa |
| 3,021,135 | A | 2/1962 | Joa |
| 3,024,957 | A | 3/1962 | Pinto |
| 3,053,427 | A | 9/1962 | Wasserman |
| 3,054,516 | A | 9/1962 | Joa |
| 3,069,982 | A | 12/1962 | Heywood et al. |
| 3,075,684 | A | 1/1963 | Rothmann |
| 3,086,253 | A | 4/1963 | Joa |
| 3,087,689 | A | 4/1963 | Heim |
| 3,089,494 | A | 5/1963 | Schwartz |
| 3,091,408 | A | 5/1963 | Schoeneman |
| 3,114,994 | A | 12/1963 | Joa |
| 3,122,293 | A | 2/1964 | Joa |
| 3,128,206 | A | 4/1964 | Dungler |
| 3,203,419 | A | 8/1965 | Joa |
| 3,230,955 | A | 1/1966 | Joa |
| 3,268,954 | A | 8/1966 | Joa |
| 3,288,037 | A | 11/1966 | Burnett |
| 3,289,254 | A | 12/1966 | Joa |
| 3,291,131 | A | 12/1966 | Joa |
| 3,301,114 | A | 1/1967 | Joa |
| 3,318,608 | A | 5/1967 | Smrekar |
| 3,322,589 | A | 5/1967 | Joa |
| 3,336,847 | A | 8/1967 | Durat |
| 3,342,184 | A | 9/1967 | Joa |
| 3,356,092 | A | 12/1967 | Joa |
| 3,360,103 | A | 12/1967 | Joa |
| 3,391,777 | A | 7/1968 | Joa |
| 3,454,442 | A | 7/1969 | Heller, Jr. |
| 3,463,413 | A | 8/1969 | Smith |
| 3,470,848 | A | 10/1969 | Dreher |
| 3,484,275 | A | 12/1969 | Lewicki, Jr. |
| 3,502,322 | A | 3/1970 | Cran |
| 3,521,639 | A | 7/1970 | Joa |
| 3,526,563 | A | 9/1970 | Schott, Jr. |
| 3,527,123 | A | 9/1970 | Dovey |
| 3,533,618 | A * | 10/1970 | Carstens ............... B65H 5/226 271/276 |
| 3,538,551 | A | 11/1970 | Joa |
| 3,540,641 | A | 11/1970 | Besnyo |
| 3,575,170 | A | 4/1971 | Clark |
| 3,607,578 | A | 9/1971 | Berg et al. |
| 3,635,462 | A | 1/1972 | Joa |
| 3,656,741 | A | 4/1972 | Macke et al. |
| 3,666,611 | A | 5/1972 | Joa |
| 3,673,021 | A | 6/1972 | Joa |
| 3,685,818 | A | 8/1972 | Burger et al. |
| 3,728,191 | A | 4/1973 | Wierzba et al. |
| 3,745,947 | A | 7/1973 | Brocklehurst |
| 3,751,224 | A | 8/1973 | Wackerle |
| 3,758,102 | A | 9/1973 | Munn et al. |
| 3,762,542 | A | 10/1973 | Grimes |
| 3,772,120 | A | 11/1973 | Radzins |
| 3,776,798 | A | 12/1973 | Milano |
| 3,796,360 | A | 3/1974 | Alexeff |
| 3,810,344 | A | 5/1974 | Evans et al. |
| 3,811,987 | A | 5/1974 | Wilkinson et al. |
| 3,816,210 | A | 6/1974 | Aoko et al. |
| 3,836,089 | A | 9/1974 | Riemersma |
| 3,847,710 | A | 11/1974 | Blomqvist et al. |
| 3,854,917 | A | 12/1974 | McKinney et al. |
| 3,883,389 | A | 5/1975 | Schott, Jr. |
| 3,888,400 | A | 6/1975 | Wiig |
| 3,901,238 | A | 8/1975 | Geller et al. |
| 3,903,768 | A | 9/1975 | Amberg et al. |
| 3,904,147 | A | 9/1975 | Taitel et al. |
| 3,918,968 | A | 11/1975 | Coast |
| 3,921,481 | A | 11/1975 | Fleetwod |
| 3,941,038 | A | 3/1976 | Bishop |

(56) References Cited

U.S. PATENT DOCUMENTS

| | | |
|---|---|---|
| 3,960,646 A | 6/1976 | Wiedamann |
| 3,988,194 A | 10/1976 | Babcock et al. |
| 3,991,994 A | 11/1976 | Farish |
| 4,002,005 A | 1/1977 | Mueller et al. |
| 4,003,298 A | 1/1977 | Schott, Jr. |
| 4,009,626 A | 3/1977 | Gressman |
| 4,009,814 A | 3/1977 | Singh |
| 4,009,815 A | 3/1977 | Ericson et al. |
| 4,053,150 A | 10/1977 | Lane |
| 4,056,919 A | 11/1977 | Hirsch |
| 4,081,301 A | 3/1978 | Buell |
| 4,090,516 A | 5/1978 | Schaar |
| 4,094,319 A | 6/1978 | Joa |
| 4,103,595 A | 8/1978 | Corse |
| 4,106,974 A | 8/1978 | Hirsch |
| 4,108,584 A | 8/1978 | Radzins et al. |
| 4,136,535 A | 1/1979 | Audas |
| 4,141,193 A | 2/1979 | Joa |
| 4,141,509 A | 2/1979 | Radzins |
| 4,142,626 A | 3/1979 | Bradley |
| 4,157,934 A | 6/1979 | Ryan et al. |
| 4,165,666 A | 8/1979 | Johnson et al. |
| 4,168,776 A | 9/1979 | Hoeboer |
| 4,171,239 A | 10/1979 | Hirsch et al. |
| 4,205,679 A | 6/1980 | Repke et al. |
| 4,208,230 A | 6/1980 | Magarian |
| 4,213,356 A | 7/1980 | Armitage |
| 4,215,827 A | 8/1980 | Roberts et al. |
| 4,220,237 A | 9/1980 | Mohn |
| 4,222,533 A | 9/1980 | Pongracz |
| 4,223,822 A | 9/1980 | Clitheroe |
| 4,231,129 A | 11/1980 | Winch |
| 4,234,157 A | 11/1980 | Hodgeman et al. |
| 4,236,955 A | 12/1980 | Prittie |
| 4,275,510 A | 6/1981 | George |
| 4,284,454 A | 8/1981 | Joa |
| 4,297,157 A | 10/1981 | Van Vilet |
| 4,307,800 A | 12/1981 | Joa |
| 4,316,756 A | 2/1982 | Wilson |
| 4,325,519 A | 4/1982 | McLean |
| 4,331,418 A | 5/1982 | Klebe |
| 4,342,206 A | 8/1982 | Rommel |
| 4,349,140 A | 9/1982 | Passafiume |
| 4,364,787 A | 12/1982 | Radzins |
| 4,374,576 A | 2/1983 | Ryan |
| 4,379,008 A | 4/1983 | Gross et al. |
| 4,394,898 A | 7/1983 | Campbell |
| 4,411,721 A | 10/1983 | Wishart |
| 4,426,897 A | 1/1984 | Littleton |
| 4,452,597 A | 6/1984 | Achelpohl |
| 4,479,836 A | 10/1984 | Dickover et al. |
| 4,492,608 A | 1/1985 | Hirsch et al. |
| 4,501,098 A | 2/1985 | Gregory |
| 4,508,528 A | 4/1985 | Hirsch et al. |
| 4,522,853 A | 6/1985 | Szonn et al. |
| 4,543,152 A | 9/1985 | Nozaka |
| 4,551,191 A | 11/1985 | Kock et al. |
| 4,578,052 A | 3/1986 | Engel et al. |
| 4,578,133 A | 3/1986 | Oshefsky et al. |
| 4,586,199 A | 5/1986 | Birring |
| 4,587,790 A | 5/1986 | Muller |
| 4,589,945 A | 5/1986 | Polit |
| 4,603,800 A | 8/1986 | Focke et al. |
| 4,606,964 A | 8/1986 | Wideman |
| 4,608,115 A | 8/1986 | Schroth et al. |
| 4,610,681 A | 9/1986 | Strohbeen et al. |
| 4,610,682 A | 9/1986 | Kopp |
| 4,614,076 A | 9/1986 | Rathemacher |
| 4,619,357 A | 10/1986 | Radzins et al. |
| 4,625,612 A | 12/1986 | Oliver |
| 4,634,482 A | 1/1987 | Lammers |
| 4,641,381 A | 2/1987 | Heran et al. |
| 4,642,150 A | 2/1987 | Stemmler |
| 4,642,839 A | 2/1987 | Urban |
| 4,650,173 A | 3/1987 | Johnson et al. |
| 4,650,406 A | 3/1987 | Peters |
| 4,650,530 A | 3/1987 | Mahoney et al. |
| 4,663,220 A | 5/1987 | Wisneski et al. |
| 4,672,705 A | 6/1987 | Bors et al. |
| 4,675,016 A | 6/1987 | Meuli et al. |
| 4,675,062 A | 6/1987 | Instance |
| 4,675,068 A | 6/1987 | Lundmark |
| 4,686,136 A | 8/1987 | Homonoff et al. |
| 4,693,056 A | 9/1987 | Raszewski |
| 4,701,239 A | 10/1987 | Craig |
| 4,707,970 A | 11/1987 | Labombarde et al. |
| 4,720,415 A | 1/1988 | Vander Wielen et al. |
| 4,723,698 A | 2/1988 | Schoonderbeek |
| 4,726,725 A | 2/1988 | Baker et al. |
| 4,726,874 A | 2/1988 | Van Vliet |
| 4,726,876 A | 2/1988 | Tomsovic, Jr. |
| 4,743,241 A | 5/1988 | Igaue et al. |
| 4,751,997 A | 6/1988 | Hirsch |
| 4,753,429 A | 6/1988 | Irvine et al. |
| 4,756,141 A | 7/1988 | Hirsch et al. |
| 4,764,325 A | 8/1988 | Angstadt |
| 4,765,780 A | 8/1988 | Angstadt |
| 4,776,920 A | 10/1988 | Ryan |
| 4,777,513 A | 10/1988 | Nelson |
| 4,782,647 A | 11/1988 | Williams et al. |
| 4,785,986 A | 11/1988 | Daane et al. |
| 4,795,416 A | 1/1989 | Cogswell et al. |
| 4,795,451 A | 1/1989 | Buckley |
| 4,795,510 A | 1/1989 | Wittrock et al. |
| 4,798,353 A | 1/1989 | Peugh |
| 4,801,345 A | 1/1989 | Dussaud et al. |
| 4,802,570 A | 2/1989 | Hirsch et al. |
| 4,826,499 A | 5/1989 | Ahr |
| 4,840,609 A | 6/1989 | Jones et al. |
| 4,845,964 A | 7/1989 | Bors et al. |
| 4,864,802 A | 9/1989 | D'Angelo |
| 4,873,813 A | 10/1989 | Labombarde et al. |
| 4,880,102 A | 11/1989 | Indrebo |
| 4,888,231 A | 12/1989 | Angstadt |
| 4,892,536 A | 1/1990 | Des Marais et al. |
| 4,904,440 A | 2/1990 | Angstadt |
| 4,908,175 A | 3/1990 | Angstadt |
| 4,909,019 A | 3/1990 | Delacretaz et al. |
| 4,909,697 A | 3/1990 | Bernard et al. |
| 4,915,767 A | 4/1990 | Rajala et al. |
| 4,917,746 A | 4/1990 | Kons |
| 4,925,520 A | 5/1990 | Beaudoin et al. |
| 4,927,322 A | 5/1990 | Schweizer et al. |
| 4,927,486 A | 5/1990 | Fattal et al. |
| 4,927,582 A | 5/1990 | Bryson |
| 4,937,887 A | 7/1990 | Schreiner |
| 4,963,072 A | 10/1990 | Miley et al. |
| 4,987,940 A | 1/1991 | Straub et al. |
| 4,994,010 A | 2/1991 | Doderer-Winkler |
| 5,000,806 A | 3/1991 | Merkatoris et al. |
| 5,007,522 A | 4/1991 | Focke et al. |
| 5,021,111 A | 6/1991 | Swenson |
| 5,025,910 A | 6/1991 | Lasure et al. |
| 5,029,505 A | 7/1991 | Holliday |
| 5,045,039 A | 9/1991 | Bay |
| 5,045,135 A | 9/1991 | Meissner et al. |
| 5,062,597 A | 11/1991 | Martin et al. |
| 5,064,179 A | 11/1991 | Martin |
| 5,064,492 A | 11/1991 | Friesch |
| 5,080,741 A | 1/1992 | Nomura et al. |
| 5,094,658 A | 3/1992 | Smithe et al. |
| 5,096,532 A | 3/1992 | Neuwirth et al. |
| 5,108,017 A | 4/1992 | Adamski, Jr. et al. |
| 5,109,767 A | 5/1992 | Nyfeler et al. |
| 5,110,403 A | 5/1992 | Ehlert |
| 5,114,392 A | 5/1992 | McAdam et al. |
| 5,127,981 A | 7/1992 | Straub et al. |
| 5,131,525 A | 7/1992 | Musschoot |
| 5,131,901 A | 7/1992 | Moll |
| 5,133,511 A | 7/1992 | Mack |
| 5,137,758 A * | 8/1992 | Kistner .......... G03C 11/08 118/231 |
| 5,147,487 A | 9/1992 | Nomura et al. |
| 5,163,594 A | 11/1992 | Meyer |

(56) References Cited

U.S. PATENT DOCUMENTS

| | | |
|---|---|---|
| 5,171,239 A | 12/1992 | Igaue et al. |
| 5,176,244 A | 1/1993 | Radzins et al. |
| 5,183,252 A | 2/1993 | Wolber et al. |
| 5,188,627 A | 2/1993 | Igaue et al. |
| 5,190,234 A | 3/1993 | Ezekiel |
| 5,195,684 A | 3/1993 | Radzins |
| 5,203,043 A | 4/1993 | Riedel |
| 5,213,645 A | 5/1993 | Nomura et al. |
| 5,222,422 A | 6/1993 | Benner, Jr. et al. |
| 5,223,069 A | 6/1993 | Tokuno et al. |
| 5,226,992 A | 7/1993 | Morman |
| 5,246,433 A | 9/1993 | Hasse et al. |
| 5,252,228 A | 10/1993 | Stokes |
| 5,267,933 A | 12/1993 | Precoma |
| 5,273,228 A | 12/1993 | Yoshida |
| 5,275,076 A | 1/1994 | Greenwalt |
| 5,275,676 A | 1/1994 | Rooyakkers et al. |
| 5,308,345 A | 5/1994 | Herrin |
| 5,328,438 A | 7/1994 | Crowley |
| 5,334,446 A | 8/1994 | Quantrille et al. |
| 5,340,424 A | 8/1994 | Matsushita |
| 5,353,909 A | 10/1994 | Mukai |
| 5,368,893 A | 11/1994 | Sommer et al. |
| 5,389,173 A | 2/1995 | Merkotoris et al. |
| 5,393,360 A | 2/1995 | Bridges et al. |
| 5,407,507 A | 4/1995 | Ball |
| 5,407,513 A | 4/1995 | Hayden et al. |
| 5,410,857 A | 5/1995 | Utley |
| 5,415,649 A | 5/1995 | Watanabe et al. |
| 5,417,132 A | 5/1995 | Cox et al. |
| 5,421,924 A | 6/1995 | Ziegelhoffer et al. |
| 5,424,025 A | 6/1995 | Hanschen et al. |
| 5,429,576 A | 7/1995 | Doderer-Winkler |
| 5,435,802 A | 7/1995 | Kober |
| 5,435,971 A | 7/1995 | Dyckman |
| 5,449,353 A | 9/1995 | Watanabe et al. |
| 5,464,401 A | 11/1995 | Hasse et al. |
| 5,472,153 A | 12/1995 | Crowley et al. |
| 5,486,253 A | 1/1996 | Otruba |
| 5,494,622 A | 2/1996 | Heath et al. |
| 5,500,075 A | 3/1996 | Herrmann |
| 5,513,936 A | 5/1996 | Dean |
| 5,516,392 A | 5/1996 | Bridges et al. |
| 5,518,566 A | 5/1996 | Bridges et al. |
| 5,525,175 A | 6/1996 | Blenke et al. |
| 5,531,850 A | 7/1996 | Herrmann |
| 5,540,647 A | 7/1996 | Weiermann et al. |
| 5,540,796 A | 7/1996 | Fries |
| 5,545,275 A | 8/1996 | Herrin et al. |
| 5,545,285 A | 8/1996 | Johnson |
| 5,552,013 A | 9/1996 | Ehlert et al. |
| 5,555,786 A | 9/1996 | Fuller |
| 5,556,246 A | 9/1996 | Broshi |
| 5,556,360 A | 9/1996 | Kober et al. |
| 5,556,504 A | 9/1996 | Rajala et al. |
| 5,560,793 A | 10/1996 | Ruscher et al. |
| 5,575,187 A | 11/1996 | Dieterlen |
| 5,582,497 A | 12/1996 | Noguchi |
| 5,586,964 A | 12/1996 | Chase |
| 5,602,747 A | 2/1997 | Rajala |
| 5,603,794 A | 2/1997 | Thomas |
| 5,624,420 A | 4/1997 | Bridges et al. |
| 5,624,428 A | 4/1997 | Sauer |
| 5,628,738 A | 5/1997 | Suekane |
| 5,634,917 A | 6/1997 | Fujioka et al. |
| 5,636,500 A | 6/1997 | Gould |
| 5,643,165 A | 7/1997 | Klekamp |
| 5,643,396 A | 7/1997 | Rajala et al. |
| 5,645,543 A | 7/1997 | Nomura et al. |
| 5,659,229 A | 8/1997 | Rajala |
| 5,660,657 A | 8/1997 | Rajala et al. |
| 5,660,665 A | 8/1997 | Jalonen |
| 5,683,376 A | 11/1997 | Kato et al. |
| 5,683,531 A | 11/1997 | Roessler et al. |
| 5,685,873 A | 11/1997 | Bruemmer |
| RE35,687 E | 12/1997 | Igaue et al. |
| 5,693,165 A | 12/1997 | Schmitz |
| 5,699,653 A | 12/1997 | Hartman et al. |
| 5,705,013 A | 1/1998 | Nease |
| 5,707,470 A | 1/1998 | Rajala et al. |
| 5,711,832 A | 1/1998 | Glaug et al. |
| 5,725,518 A | 3/1998 | Coates |
| 5,725,714 A | 3/1998 | Fujioka |
| 5,743,994 A | 4/1998 | Roessler et al. |
| 5,745,922 A | 5/1998 | Rajala et al. |
| 5,746,869 A | 5/1998 | Hayden et al. |
| 5,749,989 A | 5/1998 | Linman et al. |
| 5,759,340 A | 6/1998 | Boothe et al. |
| 5,766,389 A | 6/1998 | Brandon et al. |
| 5,766,411 A | 6/1998 | Wilson |
| 5,779,689 A | 7/1998 | Pfeifer et al. |
| 5,788,797 A | 8/1998 | Herrin et al. |
| 5,817,199 A | 10/1998 | Brennecke et al. |
| 5,827,259 A | 10/1998 | Laux et al. |
| 5,829,164 A | 11/1998 | Kotischke |
| 5,836,931 A | 11/1998 | Toyoda et al. |
| 5,858,012 A | 1/1999 | Yamaki et al. |
| 5,865,393 A | 2/1999 | Kreft et al. |
| 5,868,727 A | 2/1999 | Barr et al. |
| 5,876,027 A | 3/1999 | Fukui et al. |
| 5,876,792 A | 3/1999 | Caldwell |
| 5,879,500 A | 3/1999 | Herrin et al. |
| 5,897,291 A | 4/1999 | Gerwe et al. |
| 5,902,222 A | 5/1999 | Wessman |
| 5,902,431 A | 5/1999 | Wilkinson et al. |
| 5,904,675 A | 5/1999 | Laux et al. |
| 5,932,039 A | 8/1999 | Popp et al. |
| 5,935,367 A | 8/1999 | Hollenbeck |
| 5,938,193 A | 8/1999 | Bluemle et al. |
| 5,938,652 A | 8/1999 | Sauer |
| 5,964,390 A | 10/1999 | Borresen et al. |
| 5,964,970 A | 10/1999 | Woolwine et al. |
| 5,971,134 A | 10/1999 | Trefz et al. |
| 5,983,764 A | 11/1999 | Hillebrand |
| 6,009,781 A | 1/2000 | McNeil |
| 6,022,443 A | 2/2000 | Rajala et al. |
| 6,036,805 A | 3/2000 | McNichols |
| 6,043,836 A | 3/2000 | Kerr et al. |
| 6,050,517 A | 4/2000 | Dobrescu et al. |
| 6,074,110 A | 6/2000 | Verlinden et al. |
| 6,076,442 A | 6/2000 | Arterburn et al. |
| 6,080,909 A | 6/2000 | Osterdahl et al. |
| 6,098,249 A | 8/2000 | Toney et al. |
| 6,123,792 A | 9/2000 | Samida et al. |
| 6,138,436 A | 10/2000 | Malin et al. |
| 6,142,048 A | 11/2000 | Bradatsch et al. |
| 6,171,432 B1 | 1/2001 | Brisebois |
| 6,183,576 B1 | 2/2001 | Couillard et al. |
| 6,193,054 B1 | 2/2001 | Henson et al. |
| 6,193,702 B1 | 2/2001 | Spencer |
| 6,195,850 B1 | 3/2001 | Melbye |
| 6,196,147 B1 | 3/2001 | Burton et al. |
| 6,210,386 B1 | 4/2001 | Inoue |
| 6,212,859 B1 | 4/2001 | Bielik, Jr. et al. |
| 6,214,147 B1 | 4/2001 | Mortellite et al. |
| 6,217,274 B1 | 4/2001 | Svyatsky et al. |
| 6,250,048 B1 | 6/2001 | Linkiewicz |
| 6,264,639 B1 | 7/2001 | Sauer |
| 6,264,784 B1 | 7/2001 | Menard et al. |
| 6,276,421 B1 | 8/2001 | Valenti et al. |
| 6,276,587 B1 | 8/2001 | Borresen |
| 6,280,373 B1 | 8/2001 | Lanvin |
| 6,284,081 B1 | 9/2001 | Vogt et al. |
| 6,287,409 B1 | 9/2001 | Stephany |
| 6,305,260 B1 | 10/2001 | Truttmann et al. |
| 6,306,122 B1 | 10/2001 | Narawa et al. |
| 6,309,336 B1 | 10/2001 | Muessig et al. |
| 6,312,420 B1 | 11/2001 | Sasaki et al. |
| 6,314,333 B1 | 11/2001 | Rajala et al. |
| 6,315,022 B1 | 11/2001 | Herrin et al. |
| 6,319,347 B1 | 11/2001 | Rajala |
| 6,336,921 B1 | 1/2002 | Kato et al. |
| 6,336,922 B1 | 1/2002 | VanGompel et al. |
| 6,336,923 B1 | 1/2002 | Fujioka et al. |

(56) References Cited

U.S. PATENT DOCUMENTS

| | | |
|---|---|---|
| 6,358,350 B1 | 3/2002 | Glaug et al. |
| 6,369,291 B1 | 4/2002 | Uchimoto et al. |
| 6,375,769 B1 | 4/2002 | Quereshi et al. |
| 6,391,013 B1 | 5/2002 | Suzuki et al. |
| 6,416,697 B1 | 7/2002 | Venturino et al. |
| 6,425,430 B1 | 7/2002 | Ward et al. |
| 6,431,038 B2 | 8/2002 | Couturier |
| 6,440,246 B1 | 8/2002 | Vogt et al. |
| 6,443,389 B1 | 9/2002 | Palone |
| 6,446,795 B1 | 9/2002 | Allen et al. |
| 6,446,955 B1 * | 9/2002 | Janatka .................. B65H 3/10 271/104 |
| 6,473,669 B2 | 10/2002 | Rajala et al. |
| 6,475,325 B1 | 11/2002 | Parrish et al. |
| 6,478,786 B1 | 11/2002 | Glaug et al. |
| 6,482,278 B1 | 11/2002 | McCabe et al. |
| 6,494,244 B2 | 12/2002 | Parrish et al. |
| 6,514,233 B1 | 2/2003 | Glaug |
| 6,521,320 B2 | 2/2003 | McCabe et al. |
| 6,523,595 B1 | 2/2003 | Milner et al. |
| 6,524,423 B1 | 2/2003 | Hilt et al. |
| 6,533,879 B2 | 3/2003 | Quereshi et al. |
| 6,540,857 B1 | 4/2003 | Coenen et al. |
| 6,547,909 B1 | 4/2003 | Butterworth |
| 6,550,517 B1 | 4/2003 | Hilt |
| 6,551,228 B1 | 4/2003 | Richards |
| 6,551,430 B1 | 4/2003 | Glaug et al. |
| 6,554,815 B1 | 4/2003 | Umebayashi |
| 6,557,466 B2 | 5/2003 | Codde et al. |
| 6,569,275 B1 | 5/2003 | Popp et al. |
| 6,572,520 B2 | 6/2003 | Blumle |
| 6,581,517 B1 | 6/2003 | Becker et al. |
| 6,585,841 B1 | 7/2003 | Popp et al. |
| 6,589,149 B1 | 7/2003 | VanEperen et al. |
| 6,596,107 B2 | 7/2003 | Stopher |
| 6,596,108 B2 | 7/2003 | McCabe |
| 6,605,172 B1 | 8/2003 | Anderson et al. |
| 6,605,173 B2 | 8/2003 | Glaug et al. |
| 6,620,276 B1 | 9/2003 | Kuntze et al. |
| 6,632,209 B1 | 10/2003 | Chmielewski |
| 6,634,269 B2 | 10/2003 | Eckstein et al. |
| 6,637,583 B1 | 10/2003 | Anderson |
| 6,648,122 B1 | 11/2003 | Hirsch et al. |
| 6,649,010 B2 | 11/2003 | Parrish et al. |
| 6,656,309 B1 | 12/2003 | Parker et al. |
| 6,659,150 B1 | 12/2003 | Perkins et al. |
| 6,659,991 B2 | 12/2003 | Suckane |
| 6,675,552 B2 | 1/2004 | Kunz et al. |
| 6,682,626 B2 | 1/2004 | Mlinar et al. |
| 6,684,925 B2 | 2/2004 | Nagate et al. |
| 6,685,130 B2 | 2/2004 | Stauber et al. |
| 6,722,494 B2 | 4/2004 | Nakakado |
| 6,730,189 B1 | 5/2004 | Franzmann |
| 6,743,324 B2 | 6/2004 | Hargett et al. |
| 6,750,466 B2 | 6/2004 | Song |
| 6,758,109 B2 | 7/2004 | Nakakado |
| 6,766,817 B2 | 7/2004 | da Silva |
| 6,773,006 B2 * | 8/2004 | Andreyka ................ B65H 3/10 271/94 |
| 6,779,426 B1 | 8/2004 | Holliday |
| 6,808,582 B2 | 10/2004 | Popp et al. |
| D497,991 S | 11/2004 | Otsubo et al. |
| 6,811,019 B2 | 11/2004 | Christian et al. |
| 6,811,642 B2 | 11/2004 | Ochi |
| 6,814,217 B2 | 11/2004 | Blumenthal et al. |
| 6,820,671 B2 | 11/2004 | Calvert |
| 6,823,981 B2 | 11/2004 | Ogle et al. |
| 6,837,840 B2 | 1/2005 | Yonekawa et al. |
| 6,840,616 B2 | 1/2005 | Summers |
| 6,869,494 B2 | 3/2005 | Roessler et al. |
| 6,875,202 B2 | 4/2005 | Kumasaka et al. |
| 6,884,310 B2 | 4/2005 | Roessler et al. |
| 6,893,528 B2 | 5/2005 | Middelstadt et al. |
| 6,913,664 B2 | 7/2005 | Umebayashi et al. |
| 6,913,718 B2 | 7/2005 | Ducker |
| 6,918,404 B2 | 7/2005 | Dias da Silva |
| 6,852,186 B1 | 12/2005 | Matsuda et al. |
| 6,976,521 B2 | 12/2005 | Mlinar |
| 6,978,486 B2 | 12/2005 | Zhou et al. |
| 6,978,964 B2 | 12/2005 | Beccari |
| 7,017,321 B2 | 3/2006 | Salvoni |
| 7,017,820 B1 | 3/2006 | Brunner |
| 7,045,031 B2 | 5/2006 | Popp et al. |
| 7,047,852 B2 | 5/2006 | Franklin et al. |
| 7,048,725 B2 | 5/2006 | Kling et al. |
| 7,066,586 B2 | 6/2006 | da Silva |
| 7,069,970 B2 | 7/2006 | Tomsovic et al. |
| 7,077,393 B2 | 7/2006 | Ishida |
| 7,130,710 B2 | 10/2006 | Shechtman |
| 7,137,971 B2 | 11/2006 | Tanzer |
| 7,172,666 B2 | 2/2007 | Groves et al. |
| 7,175,584 B2 | 2/2007 | Maxton et al. |
| 7,195,684 B2 | 3/2007 | Satoh |
| 7,201,345 B2 | 4/2007 | Werner |
| 7,204,682 B2 | 4/2007 | Venturino et al. |
| 7,214,174 B2 | 5/2007 | Allen et al. |
| 7,214,287 B2 | 5/2007 | Shiomi |
| 7,220,335 B2 | 5/2007 | Van Gompel et al. |
| 7,247,219 B2 | 7/2007 | O'Dowd |
| 7,252,730 B2 | 8/2007 | Hoffman et al. |
| 7,264,686 B2 | 9/2007 | Thorson et al. |
| 7,303,708 B2 | 12/2007 | Andrews et al. |
| 7,326,311 B2 | 2/2008 | Krueger et al. |
| 7,332,459 B2 | 2/2008 | Collins et al. |
| 7,374,627 B2 | 5/2008 | McCabe |
| 7,380,213 B2 | 5/2008 | Pesin |
| 7,398,870 B2 | 7/2008 | McCabe |
| 7,399,266 B2 | 7/2008 | Aiolfi et al. |
| 7,449,084 B2 | 11/2008 | Nakakado |
| 7,452,436 B2 | 11/2008 | Andrews |
| 7,500,941 B2 | 3/2009 | Coe et al. |
| 7,533,709 B2 | 5/2009 | Meyer |
| 7,537,215 B2 | 5/2009 | Beaudoin et al. |
| 7,569,007 B2 | 8/2009 | Thoma |
| 7,587,966 B2 | 9/2009 | Nakakado et al. |
| 7,618,513 B2 | 11/2009 | Meyer |
| 7,638,014 B2 | 12/2009 | Coose et al. |
| 7,640,962 B2 | 1/2010 | Meyer et al. |
| 7,695,464 B2 | 4/2010 | Fletcher et al. |
| 7,703,599 B2 | 4/2010 | Meyer |
| 7,708,849 B2 | 5/2010 | McCabe |
| 7,770,712 B2 | 8/2010 | McCabe |
| 7,771,407 B2 | 8/2010 | Umebayashi |
| 7,780,052 B2 | 8/2010 | McCabe |
| 7,793,772 B2 | 9/2010 | Schafer |
| 7,811,403 B2 | 10/2010 | Andrews |
| 7,861,756 B2 | 1/2011 | Jenquin et al. |
| 7,871,400 B2 | 1/2011 | Sablone et al. |
| 7,909,956 B2 | 3/2011 | Coose et al. |
| 7,922,983 B2 | 4/2011 | Prokash et al. |
| 7,935,296 B2 | 5/2011 | Koele et al. |
| 7,975,584 B2 | 7/2011 | McCabe |
| 7,987,964 B2 | 8/2011 | McCabe |
| 8,007,484 B2 | 8/2011 | McCabe et al. |
| 8,007,623 B2 | 8/2011 | Andrews |
| 8,011,493 B2 | 9/2011 | Giuliani et al. |
| 8,016,972 B2 | 9/2011 | Andrews et al. |
| 8,025,652 B2 | 9/2011 | Hornung et al. |
| 8,062,279 B2 | 11/2011 | Miyamoto |
| 8,062,459 B2 | 11/2011 | Nakakado et al. |
| 8,100,173 B2 | 1/2012 | Hornung et al. |
| 8,172,977 B2 | 5/2012 | McCabe et al. |
| 8,176,573 B2 | 5/2012 | Popp et al. |
| 8,178,035 B2 | 5/2012 | Edvardsson et al. |
| 8,182,624 B2 | 5/2012 | Handziak |
| 8,182,735 B2 | 5/2012 | Edvardsson |
| 8,182,736 B2 | 5/2012 | Edvardsson |
| 8,257,237 B2 | 9/2012 | Burns, Jr. et al. |
| 8,273,003 B2 | 9/2012 | Umebayashi et al. |
| 8,293,056 B2 | 10/2012 | McCabe |
| 8,295,552 B2 | 10/2012 | Mirtich et al. |
| 8,381,489 B2 | 2/2013 | Freshwater et al. |
| 8,398,793 B2 | 3/2013 | Andrews et al. |
| 8,417,374 B2 | 4/2013 | Meyer et al. |

(56) References Cited

U.S. PATENT DOCUMENTS

| | | | |
|---|---|---|---|
| 8,439,814 B2 | 5/2013 | Piantoni et al. | |
| 8,460,495 B2 | 6/2013 | McCabe | |
| 8,485,956 B2 | 7/2013 | Burns, Jr. et al. | |
| 8,512,496 B2 | 8/2013 | Makimura | |
| 8,607,959 B2 | 12/2013 | Papsdorf et al. | |
| 8,656,817 B2 | 2/2014 | Fritz et al. | |
| 8,663,411 B2 | 3/2014 | McCabe | |
| 8,673,098 B2 | 3/2014 | McCabe | |
| 8,794,115 B2 | 8/2014 | McCabe | |
| 8,939,445 B2 * | 1/2015 | Schoultz | B65G 39/02 271/108 |
| 9,315,331 B2 * | 4/2016 | Gieser | B65G 29/00 |
| 2001/0012813 A1 | 8/2001 | Bluemle | |
| 2001/0017181 A1 | 8/2001 | Otruba et al. | |
| 2001/0035332 A1 | 11/2001 | Zeitler | |
| 2001/0042591 A1 | 11/2001 | Milner et al. | |
| 2002/0040630 A1 | 4/2002 | Piazza | |
| 2002/0046802 A1 | 4/2002 | Tachibana et al. | |
| 2002/0059013 A1 | 5/2002 | Rajala et al. | |
| 2002/0084568 A1 | 7/2002 | Codde et al. | |
| 2002/0096241 A1 | 7/2002 | Instance | |
| 2002/0125105 A1 | 9/2002 | Nakakado | |
| 2002/0162776 A1 | 11/2002 | Hergeth | |
| 2003/0000620 A1 | 1/2003 | Herrin et al. | |
| 2003/0015209 A1 | 1/2003 | Gingras et al. | |
| 2003/0115660 A1 | 1/2003 | Hopkins | |
| 2003/0051802 A1 | 3/2003 | Hargett et al. | |
| 2003/0052148 A1 | 3/2003 | Rajala et al. | |
| 2003/0066585 A1 | 4/2003 | McCabe | |
| 2003/0083638 A1 | 5/2003 | Molee | |
| 2003/0084984 A1 | 5/2003 | Glaug et al. | |
| 2003/0089447 A1 | 5/2003 | Molee et al. | |
| 2003/0121244 A1 | 7/2003 | Abba | |
| 2003/0121614 A1 | 7/2003 | Tabor et al. | |
| 2003/0135189 A1 | 7/2003 | Umebayashi | |
| 2003/0150551 A1 | 8/2003 | Baker | |
| 2003/0226862 A1 | 12/2003 | Vogt et al. | |
| 2004/0007328 A1 | 1/2004 | Popp et al. | |
| 2004/0016500 A1 | 1/2004 | Tachibana et al. | |
| 2004/0044325 A1 | 3/2004 | Corneliusson | |
| 2004/0073187 A1 | 4/2004 | Karami | |
| 2004/0084468 A1 | 5/2004 | Kelbert et al. | |
| 2004/0087425 A1 | 5/2004 | Tony et al. | |
| 2004/0098791 A1 | 5/2004 | Faulks | |
| 2004/0112517 A1 | 6/2004 | Groves et al. | |
| 2004/0122413 A1 | 6/2004 | Roessler et al. | |
| 2004/0157041 A1 | 8/2004 | Leboeuf et al. | |
| 2004/0164482 A1 | 8/2004 | Edinger | |
| 2004/0167493 A1 | 8/2004 | Jarpenberg et al. | |
| 2004/0177737 A1 | 9/2004 | Adami | |
| 2004/0182213 A1 | 9/2004 | Wagner et al. | |
| 2004/0182497 A1 | 9/2004 | Lowrey | |
| 2004/0216830 A1 | 11/2004 | Van Eperen | |
| 2004/0228709 A1 | 11/2004 | Ueda | |
| 2005/0000628 A1 | 1/2005 | Norrby | |
| 2005/0022476 A1 | 2/2005 | Hamer | |
| 2005/0026760 A1 | 2/2005 | Yamamoto et al. | |
| 2005/0056678 A1 | 3/2005 | Nomura et al. | |
| 2005/0077418 A1 | 4/2005 | Werner et al. | |
| 2005/0101929 A1 | 5/2005 | Waksmundzki | |
| 2005/0139713 A1 | 6/2005 | Weber et al. | |
| 2005/0196538 A1 | 9/2005 | Sommer et al. | |
| 2005/0230056 A1 | 10/2005 | Meyer et al. | |
| 2005/0230449 A1 | 10/2005 | Meyer et al. | |
| 2005/0233881 A1 | 10/2005 | Meyer | |
| 2005/0234412 A1 | 10/2005 | Andrews et al. | |
| 2005/0257881 A1 | 11/2005 | Coose et al. | |
| 2005/0275148 A1 | 12/2005 | Beaudoin et al. | |
| 2006/0011030 A1 | 1/2006 | Wagner et al. | |
| 2006/0021300 A1 | 2/2006 | Tada et al. | |
| 2006/0099055 A1 | 5/2006 | Stefani | |
| 2006/0137298 A1 | 6/2006 | Oshita et al. | |
| 2006/0199718 A1 | 9/2006 | Thoma | |
| 2006/0201619 A1 | 9/2006 | Andrews | |
| 2006/0224137 A1 | 10/2006 | McCabe et al. | |
| 2006/0265867 A1 | 11/2006 | Schaap | |
| 2006/0266465 A1 | 11/2006 | Meyer | |
| 2007/0074953 A1 | 4/2007 | McCabe | |
| 2007/0131343 A1 | 6/2007 | Nordang | |
| 2007/0131817 A1 | 6/2007 | Fromm | |
| 2007/0140817 A1 | 6/2007 | Hansl | |
| 2008/0041206 A1 | 2/2008 | Mergola et al. | |
| 2008/0125738 A1 | 5/2008 | Tsuji et al. | |
| 2008/0208152 A1 | 8/2008 | Eckstein et al. | |
| 2008/0210067 A1 | 9/2008 | Schlinz et al. | |
| 2008/0223537 A1 | 9/2008 | Wiedmann | |
| 2008/0281286 A1 | 11/2008 | Guzman | |
| 2008/0287898 A1 | 11/2008 | Guzman | |
| 2009/0020211 A1 | 1/2009 | Andrews et al. | |
| 2009/0126864 A1 | 5/2009 | Tachibana et al. | |
| 2009/0198205 A1 | 8/2009 | Malowaniec et al. | |
| 2009/0212468 A1 | 8/2009 | Edvardsson et al. | |
| 2010/0078119 A1 | 4/2010 | Yamamoto | |
| 2010/0078120 A1 | 4/2010 | Otsubo | |
| 2010/0078127 A1 | 4/2010 | Yamamoto | |
| 2010/0193135 A1 | 8/2010 | Eckstein et al. | |
| 2010/0193138 A1 | 8/2010 | Eckstein | |
| 2010/0193155 A1 | 8/2010 | Nakatani | |
| 2010/0249737 A1 | 9/2010 | Ito et al. | |
| 2011/0003673 A1 | 1/2011 | Piantoni et al. | |
| 2011/0033270 A1 | 2/2011 | Toncelli | |
| 2011/0106042 A1 | 5/2011 | Sablone et al. | |
| 2012/0079926 A1 | 4/2012 | Long et al. | |
| 2012/0123377 A1 | 5/2012 | Back | |
| 2012/0172828 A1 | 7/2012 | Koenig et al. | |
| 2012/0270715 A1 | 10/2012 | Motegi et al. | |
| 2012/0285306 A1 | 11/2012 | Weibelt | |
| 2012/0310193 A1 | 12/2012 | Ostertag | |
| 2012/0312463 A1 | 12/2012 | Ogasawara et al. | |
| 2013/0066613 A1 | 3/2013 | Russell | |
| 2013/0079741 A1 | 3/2013 | Nakashita | |
| 2013/0239765 A1 | 9/2013 | McCabe et al. | |
| 2014/0155855 A1 | 6/2014 | Romzek et al. | |

FOREIGN PATENT DOCUMENTS

| | | |
|---|---|---|
| CA | 1153345 | 9/1983 |
| CA | 1190078 | 7/1985 |
| CA | 1210744 | 9/1986 |
| CA | 1212132 | 9/1986 |
| CA | 1236056 | 5/1988 |
| CA | 1249102 | 1/1989 |
| CA | 1292201 | 11/1991 |
| CA | 1307244 | 9/1992 |
| CA | 1308015 | 9/1992 |
| CA | 1310342 | 11/1992 |
| CA | 2023816 | 3/1994 |
| CA | 2330679 | 9/1999 |
| CA | 2404154 | 10/2001 |
| CA | 155189 | 12/2004 |
| CA | 2541194 | 10/2006 |
| CA | 2559517 | 4/2007 |
| CA | 2337700 | 8/2008 |
| CA | 2407867 | 6/2010 |
| CA | 2699136 | 10/2010 |
| CA | 142627 | 6/2013 |
| CA | 2600432 | 7/2013 |
| CA | 2573445 | 3/2014 |
| CA | 2547464 | 4/2014 |
| CN | 202105105 | 1/2012 |
| DE | 60123502 | 10/2006 |
| DE | 60216550 | 12/2006 |
| DE | 102005035544 | 2/2007 |
| DE | 1020060472-80 | 4/2007 |
| DE | 102005048868 | 4/2007 |
| DE | 102007063209 | 6/2009 |
| EP | 0044206 | 1/1982 |
| EP | 0048011 | 3/1982 |
| EP | 0089106 | 9/1983 |
| EP | 0099732 | 2/1984 |
| EP | 0206208 | 12/1986 |
| EP | 0304140 | 2/1989 |
| EP | 0411287 | 2/1991 |
| EP | 0439897 | 8/1991 |

(56) References Cited

FOREIGN PATENT DOCUMENTS

| | | |
|---|---|---|
| EP | 0455231 A1 | 11/1991 |
| EP | 510251 | 10/1992 |
| EP | 0589859 | 3/1994 |
| EP | 0676352 | 4/1995 |
| EP | 0652175 A1 | 5/1995 |
| EP | 0811473 | 12/1997 |
| EP | 0812789 | 12/1997 |
| EP | 0901780 | 3/1999 |
| EP | 0990588 | 4/2000 |
| EP | 1132325 A2 | 9/2001 |
| EP | 1035818 | 4/2002 |
| EP | 1199057 | 4/2002 |
| EP | 1366734 | 12/2003 |
| EP | 1393701 | 3/2004 |
| EP | 1415628 | 5/2004 |
| EP | 1433731 | 6/2004 |
| EP | 1571249 | 9/2005 |
| EP | 1619008 | 1/2006 |
| EP | 1707168 A2 | 10/2006 |
| EP | 1726414 | 11/2006 |
| EP | 1302424 | 12/2006 |
| EP | 1801045 | 6/2007 |
| EP | 1870067 | 12/2007 |
| EP | 1941853 | 7/2008 |
| EP | 1961403 | 8/2008 |
| EP | 1994919 | 11/2008 |
| EP | 2180864 | 11/2008 |
| EP | 2211812 | 11/2008 |
| EP | 2103427 | 9/2009 |
| EP | 2233116 | 9/2010 |
| EP | 2238955 | 10/2010 |
| EP | 1175880 | 5/2012 |
| EP | 2508156 | 10/2012 |
| EP | 1868821 | 1/2013 |
| EP | 2036522 | 3/2013 |
| EP | 1272347 | 4/2013 |
| EP | 2032338 | 8/2013 |
| EP | 2659869 | 11/2013 |
| EP | 2332505 | 12/2013 |
| EP | 2412348 | 3/2014 |
| EP | 2829257 | 1/2015 |
| ES | 509706 | 11/1982 |
| ES | 520559 | 12/1983 |
| ES | 296211 | 12/1987 |
| ES | 2310447 | 7/2009 |
| ES | 2311349 | 9/2009 |
| FR | 2177355 | 11/1973 |
| FR | 2255961 | 7/1975 |
| FR | 1132325 | 10/2006 |
| FR | 2891811 | 4/2007 |
| GB | 191101501 A | 1/1912 |
| GB | 439897 | 12/1935 |
| GB | 856389 | 12/1960 |
| GB | 941073 | 11/1963 |
| GB | 1096373 | 12/1967 |
| GB | 1126539 | 9/1968 |
| GB | 1346329 | 2/1974 |
| GB | 1412812 | 11/1975 |
| GB | 1467470 | 3/1977 |
| GB | 2045298 | 10/1980 |
| GB | 2115775 | 9/1983 |
| GB | 2288316 | 10/1995 |
| IT | 1374910 | 5/2010 |
| IT | 1374911 | 5/2010 |
| JP | 428364 | 1/1992 |
| JP | 542180 | 2/1993 |
| JP | 576566 | 3/1993 |
| JP | 626160 | 2/1994 |
| JP | 626161 | 2/1994 |
| JP | 6197925 A | 7/1994 |
| JP | 9299398 | 11/1997 |
| JP | 10035621 | 2/1998 |
| JP | 10-277091 A | 10/1998 |
| JP | 2008-161300 | 7/2008 |
| SE | 0602047 | 5/2007 |
| SE | 529295 | 6/2007 |
| SE | 532059 | 10/2009 |
| WO | WO08155618 | 12/1988 |
| WO | WO93/15248 | 8/1993 |
| WO | WO9403301 | 2/1994 |
| WO | WO97/23398 | 7/1997 |
| WO | WO9732552 | 9/1997 |
| WO | WO9747265 | 12/1997 |
| WO | WO9747810 | 12/1997 |
| WO | WO9821134 | 5/1998 |
| WO | WO98/55298 | 12/1998 |
| WO | WO9907319 | 2/1999 |
| WO | WO9913813 A1 | 3/1999 |
| WO | WO9932385 | 7/1999 |
| WO | WO9965437 | 12/1999 |
| WO | WO01//02277 | 1/2001 |
| WO | WO0143682 | 6/2001 |
| WO | WO0172237 A2 | 10/2001 |
| WO | WO2003/031177 | 4/2003 |
| WO | WO04007329 | 1/2004 |
| WO | WO05075163 | 8/2005 |
| WO | WO2006038946 | 4/2006 |
| WO | WO07029115 | 3/2007 |
| WO | WO07039800 | 4/2007 |
| WO | WO2007126347 | 11/2007 |
| WO | WO08001209 | 1/2008 |
| WO | WO2008/015594 | 2/2008 |
| WO | WO2008037281 | 4/2008 |
| WO | WO2008/123348 | 10/2008 |
| WO | WO2009/065497 | 3/2009 |
| WO | WO2009/065500 | 3/2009 |
| WO | WO2010028786 | 3/2010 |
| WO | WO2011101773 | 8/2011 |
| WO | WO2012/123813 A1 | 9/2012 |
| WO | WO2014/021897 | 2/2014 |

OTHER PUBLICATIONS

Search Report and Written Opinion, related to PCT/US16/43683, dated Dec. 7, 2016, 18 pages.

\* cited by examiner

VACUUM COMMUTATION APPARATUS AND METHODS

RELATED APPLICATIONS

This application claims the benefit of provisional application Ser. No. 62/196,736 filed 24 Jul. 2015. This application also claims the benefit of provisional application Ser. No. 62/248,155 filed 29 Oct. 2015.

BACKGROUND OF THE INVENTION

The present invention relates to disposable hygiene products and more specifically, to methods and apparatuses for processing disposable hygiene products such as baby diapers, adult diapers, disposable undergarments, incontinence devices, sanitary napkins and the like.

More specifically, the invention relates to novel vacuum commutation. A puck or drum is used in a novel way with a novel vacuum applicator. Vacuum, which for the purpose of the following description is defined to mean air pressure that is lower than ambient air pressure, is used in many parts of a diaper manufacturing process. For instance, during pulp core formation, ambient air flows through the surface of the forming pockets to the vacuum manifolds. This airflow pulls pulp fibers into forming pockets on a core forming drum. Elsewhere along the manufacturing process, vacuum is used. For instance, a common method of applying discrete pieces of one web to another is by use of a slip-and-cut applicator. A slip-and-cut applicator is typically comprised of a cylindrical rotating vacuum anvil, a rotating knife roll, and a transfer device. In typical applications, an incoming web is fed at a relatively low speed along the vacuum face of the rotating anvil, which is moving at a relatively higher surface speed and upon which the incoming web is allowed to "slip". A knife-edge, mounted on the rotating knife roll, cuts a off a segment of the incoming web against the anvil face. This knife-edge is preferably moving at a surface velocity similar to that of the anvil's surface. Once cut, the web segment is held by the air pressure differential between the ambient air on the exterior of the web segment and the vacuum holes on the anvil's face as it is carried at the anvil's speed downstream to the transfer point where the web segment is transferred to the traveling web. Vacuum can also be used in vacuum conveyors.

Typical vacuum rolls used in the prior art have rows of vacuum holes which are fed by cross-drilled ports, each being exposed to the source of vacuum by commutations, as the ports move into a zone of negative pressure in a stationary manifold. Such a configuration serves to apply vacuum sequentially to each successive row of holes.

Continual improvements and competitive pressures have incrementally increased the operational speeds of disposable diaper converters. As speeds increased, the mechanical integrity and operational capabilities of the applicators had to be improved accordingly. The prior art is quite successful when processing nonporous or low porosity full-width or symmetrical webs using vacuum, and vacuum is nearly universally used in diaper production. However, as speeds have increased in manufacturing and raw material webs have become more porous and lighter weight, so too has vacuum demand increased. Along with significant increase in vacuum demand comes the expense of powering conventional vacuum forming techniques, and the noise associated with traditional vacuum pumps.

It is therefore an object of this invention to provide an apparatus which can provide a better solution for vacuum commutation. The vacuum can be used for whatever purpose desired, including maintaining control over diaper webs or discrete portions of diaper webs, including sections of various shapes, and to decrease reliance on traditional vacuum generation.

SUMMARY OF THE INVENTION

The present invention provides a method and apparatus for providing controlled and preferably zoned vacuum commutation. In one embodiment, a rotatably driven vacuum commutation zone (or internal vacuum manifold), is independently driven internal to a preferably porous vacuum roll or drum. The vacuum manifold applies vacuum through pores in the driven porous vacuum roll in order to hold material against an external surface of the vacuum roll.

The combination porous roll and internal vacuum manifold can be used to transport materials from a pickup position to a deposition position, transport materials in a rotatable or linear fashion, as a surface for a slip/cut operation, or any other way seen fit.

By independently rotating or otherwise moving the internal vacuum manifold and independently rotating or otherwise moving the porous vacuum roll, tightly controlled, yet quickly rotating vacuum control over zones, can be achieved and achieved sequentially.

Different sequences of rotation of the vacuum manifold relative to the porous roll can be used. The vacuum manifold can accelerate rotationally relative to the porous roll, rotate at the same speed as the porous roll, or decelerate or move in reverse relative to the porous roll, all depending on the desired material transport sequence.

In one embodiment, a pair of porous rolls can be placed in close proximity and operated in conjunction with one another. In this embodiment, sequences used are to transfer articles between the two rolls at a common transfer point. In another embodiment, the pickup and drop off (or acquisition and deposition) points are at different locations.

Control of the rotational motion of the vacuum manifold can be accomplished with a cam. Different cams could produce different rotational sequences of the vacuum manifold. Control of the rotational motion of the vacuum manifold could also be accomplished, for instance by a servo motor. This configuration would allow for reverse rotational travel of the vacuum manifold. Reversing could be done when time in the sequence permits to allow for a longer run up to matched speed.

In a preferred operation sequence, the porous roll rotates at constant speed. At an acquisition point, a trailing edge of the vacuum manifold underlies the leading edge of the article to be transported. After the article has transferred to the porous roll, the vacuum manifold then rotates at the same speed as the porous roll. The porous roll receives the discrete object at speed to rotate the discrete object into deposition position, at which point the leading edge of the vacuum manifold precisely stops rotation, leaving the article to be transported free to be placed, deposited, or secondarily transported as desired (for instance by depositing the article to be transported onto a carrier web, or onto a vacuum conveyor). The trailing edge can then be repositioned to begin the next pickup/deposition sequence. A series of vacuum manifolds can be supplied about an interior surface of the porous roll to commute vacuum to different peripheral regions of the porous roll.

In summary, the external porous roll rotates such that the surface of the roll is traveling at the same speed as the incoming discrete element. The internal vacuum manifold is controlled such that it stops rotating when its trailing wall is positioned immediately downstream of the pickup point. As the leading edge of the discrete article reaches the edge of the internal vacuum manifold the air flowing from the atmosphere into the vacuum zone forces the leading edge of the discrete article to transfer to and be held against the surface of the porous roll. Likewise, the remainder of the discrete article will transfer onto the porous roll as the porous roll advances.

After the trailing edge of a discrete article is transferred to the surface of a porous roll, the internal vacuum manifold positioned within the porous roll accelerates to match the rotational velocity of the porous roll. The internal vacuum manifold decelerates to a stop when its leading wall reaches a deposition point and air flowing out of the porous roll into the vacuum zone of the receiving device forces the discrete article to transfer from the surface of the porous roll onto a receiving device. Likewise, the remainder of the discrete article transfers onto the receiving device as the discrete article continues to advance. After the discrete article has transferred to the receiving device, the internal vacuum manifold returns to its position downstream of the pickup point and the cycle repeats.

A transition position where air flow direction switches from inward into a drum, to outward, is preferably offset either upstream or downstream of the discrete article transfer positions by a selected amount to compensate for variations in the system.

In another aspect of the invention, ambient air can flow from the inside of the drum outward to eliminate or minimize overlapping low pressure zones, which in turn will preferably: 1) eliminate or minimize inrushes of air at the edges of a discrete article; 2) produce an airflow direction that is approximately perpendicular to the surface to which the discrete element is riding upon.

In another aspect of the invention, a porous drum is provided with micro-pores to, preferably: 1) reduce airflow requirements in the system; 2) provide more complete sealing of the pores and thereby increase holding forces on the discrete article; 3) minimize "dead zones" or areas with no inward air flow, between pores to minimize the potential for discrete article edge flip backs.

In another aspect of the invention, the drums and vacuum chambers have variable motion profiles. Because of the variable motion profiles, it is possible to accelerate or decelerate the speed of the unit to change the spacing between the discrete elements being transported.

In another aspect of the invention, multiple units work in conjunction, each unit processing every other discrete article in a continuous stream of discrete articles to change the spacing between discrete articles by large amounts such as a 5:1 spacing increase. Discrete product or patch flow enters drum 200. Nested ears come in close to each other, but must be deposited far from each other. The rolls could be in line with each other in the cross direction In another embodiment, controlled vacuum is applied sequentially to a traveling body, such as a puck or a rotating and revolving puck. Also disclosed is a method and apparatus for providing a rotatably driven multi-zoned vacuum puck used to turn discrete articles 180 degrees (through rotation of the puck) and transport them from a pickup position to a deposition position (preferably through revolution of a puck about a central axis carrying a plurality of pucks). An external vacuum manifold is employed to apply vacuum through internal vacuum passages in the puck when the passages are located in positions between the downstream side of the pick-up position and the upstream side of the deposition position. When a vacuum passage is engaged with the vacuum manifold, ambient air flows into the pores on the surface of the puck in order to hold material against the puck's external surface. Conversely, when a vacuum passage is not engaged with the vacuum manifold, ambient air flows can flow out of the pores on the surface of the puck.

The vacuum puck rotates such that the surface of the puck is traveling at the same speed as the incoming discrete element. The external vacuum manifold is positioned such that ambient air flows outward through the surface of the puck at points immediately upstream of the pick-up point and ambient air flows inward through the pores in the surface of the puck at points immediately downstream of the pick-up point. As the leading edge of the discrete article reaches the pick-up point, air flowing from the atmosphere into the vacuum puck forces the leading edge of the discrete article to transfer to and be held against the surface of the puck. Likewise, the remainder of the discrete article can transfer onto the porous roll as the porous roll advances.

After the trailing edge of the discrete article is transferred to the surface of the vacuum puck, the puck continues to rotate and thereby transports the discrete article to the deposition point. The external vacuum manifold ends immediately upstream of the deposition point such that ambient air flows into the puck upstream of the deposition point and ambient air flows out of the puck downstream of the deposition point. As the leading edge of the discrete article passes the deposition point, air flowing out of the puck and into the vacuum zone of the receiving device forces the discrete article to transfer from the surface of the porous roll onto the receiving device. Likewise, the remainder of the discrete article transfers onto the receiving device as the discrete article continues to advance. After the discrete article has transferred to the receiving device, the vacuum puck returns to its original orientation and position upstream of the pickup point and the cycle repeats.

In such a puck system, ambient air can flow from the inside of the puck outward to: 1) eliminate or minimize overlapping low pressure zones which in turn eliminates or minimizes in-rushes of air at the edges of the patch; 2) results in an airflow direction that is approximately perpendicular to the surface to which the discrete element is riding upon. Such a puck system also can utilize micro-pores to: 1) reduce airflow requirements; 2) provide more complete sealing of the pores and thereby increases holding force on the discrete article; and 3) minimize dead zones between pores to minimize the potential for discrete article edge flip backs.

A process is disclosed that optimizes repeatability of discrete article transfer from one carrier device to a second carrier device by managing the direction of the air flow during transfer. The dispersing device enables airflow into the surface of the device upstream of the transfer position and out of the surface of the device downstream of the transfer position. Conversely, the receiving device is designed to enable airflow out of the surface of the device upstream of the transfer position and into the surface of the device downstream of the transfer position. This process eliminates overlapping low pressure zones and thereby minimizes the potential for in-rushes of ambient air that can cause the edges of the discrete article to be disturbed before, during, and after transfer between the carrier devices, and also enables the benefits previously described.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
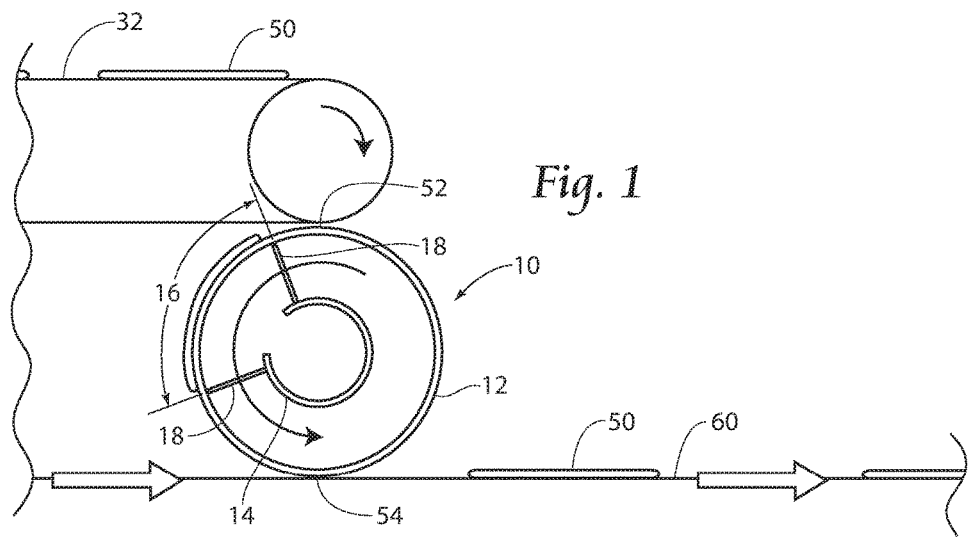
FIG. 1 is a side view of a porous roll and internal independently rotatable vacuum manifold carrying a discrete component of a disposable article between an acquisition point and a deposition point.

Referring now to FIG. 1, a side view of a system 10 comprising a porous roll 12 and internal independently rotatable vacuum manifold 14 carrying a discrete component of a disposable article 50 between an acquisition point 52 and a deposition point 54 is shown.

A conveyor 32 carries discrete components 50 towards an acquisition point 52. At the acquisition point 52, control of the discrete component 50 is handed off to a porous roll and vacuum manifold combination 10. Vacuum is drawn through the vacuum manifold 14, and in particular through a hollow shaft of the manifold 14, towards a vacuum application zone 16. This vacuum withdrawal action draws air through voids or pore spaces 24 of porous roll 12. This in turn draws and retains discrete component 50 to an exterior surface of porous roll 12, when desired. As porous roll 12 rotates, it carries discrete component 50 from the acquisition point 52 to deposition point 54. At deposition point 54, control of the discrete component 50 is handed off to a carrier web or vacuum conveyor or a bonder, shown generally at 60. Alternatively, at deposition point 54, control of the discrete component 50 can be handed off to a second porous roll and vacuum manifold combination 10. Two manifold walls 18 proscribe the circumferential area to which vacuum is applied to pores 24 of porous roll 12.

Figure 2:
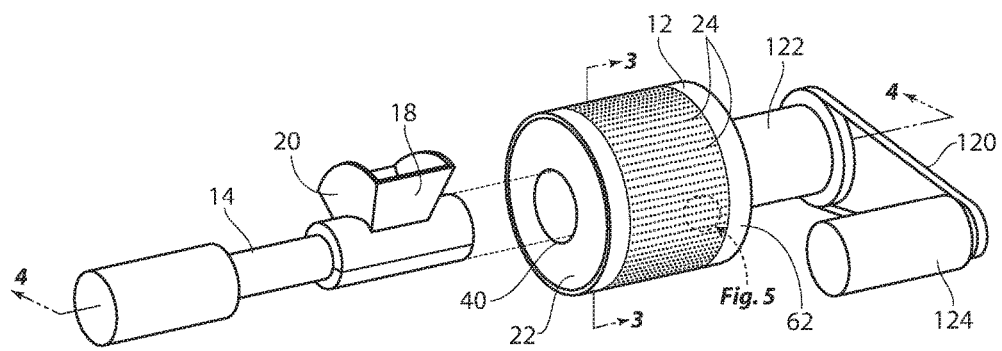
FIG. 2 is an exploded view of certain components of the porous roll and internal independently rotatable vacuum manifold.

Referring now to FIG. 2, the structure of the system 10 is described more fully. An independently driven hollow manifold shaft 14 is coupled to a vacuum manifold defined by sidewalls 18 and end walls 20 of the vacuum application zone 16. The vacuum manifold application zone 16 is configured to fit within porous roll 12 as shown in FIG. 1, through a shaft void 40 in porous roll 12 receiving independently driven hollow manifold shaft 14, through which vacuum is drawn. Porous roll 12 is provided with sidewalls 22 which enable ambient air to enter the interior of porous roll 12. Nonporous zone 62 can be supplied on the porous roll 12 to delineate a cross-machine direction extent of vacuum commutation through pores 24. Porous roll 12 is preferably rotated independently of the manifold shaft 14, porous roll 12 being rotated by a drive motor 124 which rotates a drive belt 120 which is coupled to a porous roll driveshaft 122 coupled the porous roll 12. In this manner, it is possible to rotate the manifold shaft 14 and associated vacuum application zone 16 independent of the rotation of the porous roll 12.

Figure 3:
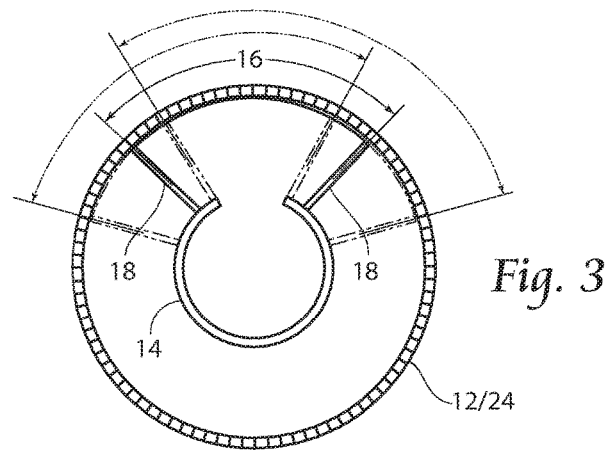
FIG. 3 is a side view of the porous roll and internal independently rotatable vacuum manifold showing independent rotational capabilities.

Referring now to FIG. 3, it is possible to configure the manifold sidewalls 18 at different circumferential spacings to define different smaller or larger zones of vacuum commutation to the exterior surface of porous roll 12.

Figure 4:
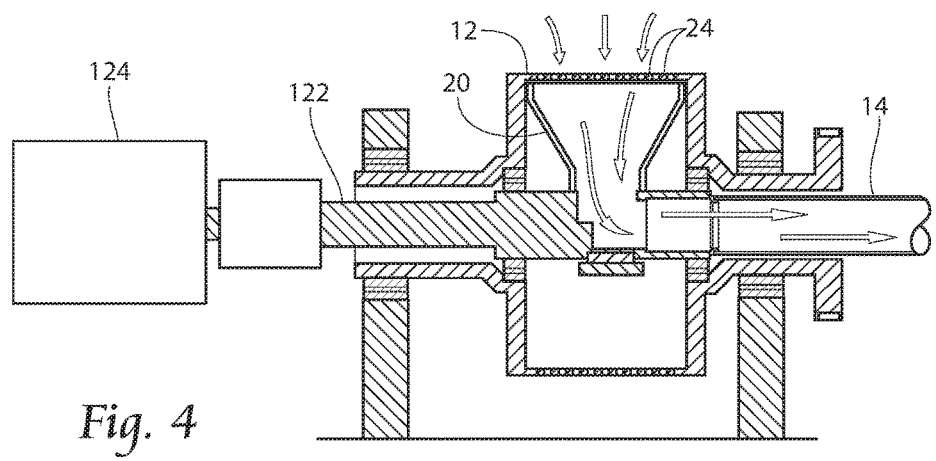
FIG. 4 is a side view of the porous roll and internal independently rotatable vacuum manifold to which vacuum is applied, with air being drawn through the porous roll.

Referring now to FIG. 4, a side view of the porous roll 12 and internal independently rotatable vacuum manifold shaft 14 which vacuum is applied as shown. Ambient air flows through the porous roll 12, through pores 24, toward the lower pressure vacuum application zone 16 to manifold shaft. 14, and particularly through shaft 14 by action of a vacuum source (not shown). Motor 124 is operable to rotate shaft 122 carrying porous roll 12.

Figure 5:
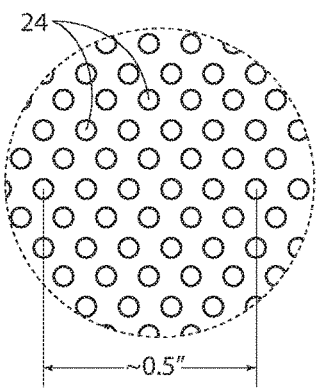
FIG. 5 is a close-up view of exemplary pores of the porous roll.

Referring now to FIG. 5, an exemplary size and configuration of pores 24 of the porous roll 12 is shown. It can be seen that preferably pores 24 are quite small in order to reduce the amount of air volume required of the system, and to prevent airborne contaminants such as pulp fluff fibers and non woven plastic fabric fibers from plugging the holes. In addition, the exemplary size of the pores 25 should be small enough that the fibers of the material in the article being transferred block some, all or preferably a majority of the surface area of each pore and thereby approximates a complete seal at the overlap of the fibers and the pores. This increases the force that holds the article to the porous roll 12 while reducing vacuum supply sizing. Further, reducing the pore size enables the distance between pores to be reduced while maintaining the same ratio of total pore opening area to closed (non porous) area of the porous drum 12. This minimizes the potential for an edge of the article from landing in a non porous area of the porous drum and thereby minimizes the potential for the edge of the article to fold back upon itself because it is not held down against the surface of the porous roll.

Referring now generally to FIGS. 6-13, side views of a sequence of operation of the rotatable porous roll and internal independently rotatable vacuum manifold transporting a discrete component of a disposable article between acquisition point 52 and a deposition point 54 is shown.

Figure 6:
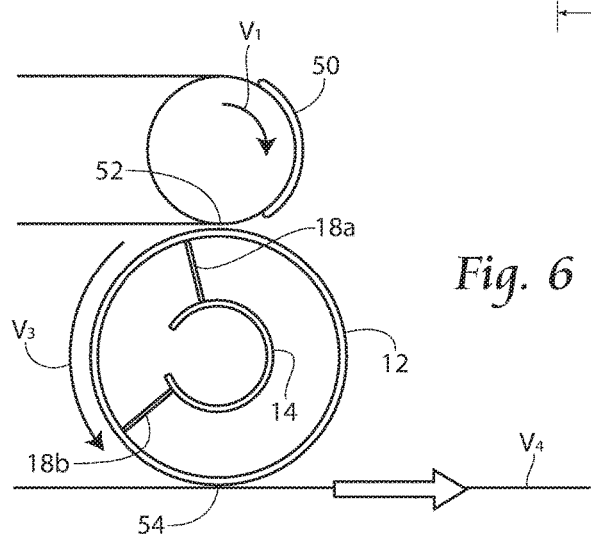
FIGS. 6-13 are side views of a sequence of operation of the porous roll and internal independently rotatable vacuum manifold transporting a discrete component of a disposable article between an acquisition point and a deposition point.
Figure 7:
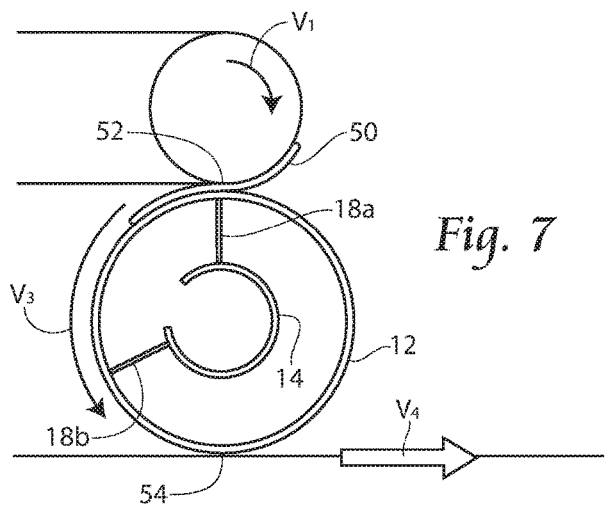
Figure 8:
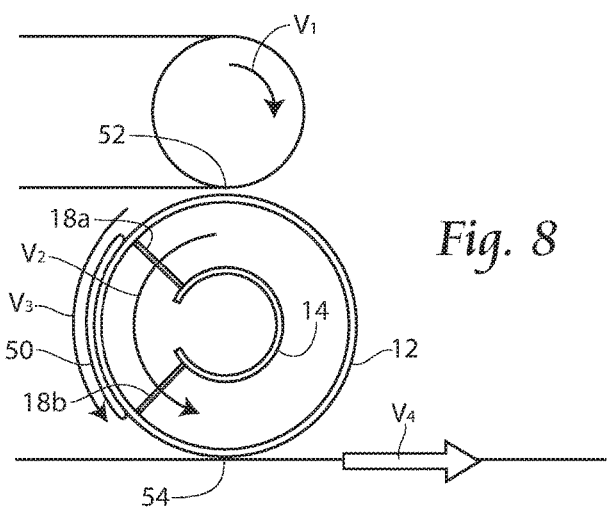

Beginning the sequence with reference to FIG. 6, discrete element 50 approaches acquisition point 52 at a velocity V1. Trailing manifold wall 18a rotates within porous roll 12, until it reaches a position immediately downstream of the acquisition point 52. At that point, the trailing manifold wall stops, or V2 goes to zero, and remains in this position until a leading edge of discrete element. 50 reaches acquisition point 52. Referring now to FIG. 7, as porous roll 12 rotates at V3 and manifold shaft 14 does not rotate, vacuum is applied through pores 24 of porous roll 12 to carry discrete element 50 from the acquisition point 52 to a position where the trailing edge of discrete element 50 reaches trailing manifold wall 18. Manifold shaft 14 then accelerates to V2 and transports discrete element 50 to deposition point 54. Referring now to FIG. 8, in a preferable embodiment, the circumferential distance between leading manifold wall 18a and trailing manifold wall 18b approximates a machine direction length of discrete element 50; however, the circumferential distance between leading manifold wall 18a and trailing manifold wall 18b can be longer or shorter than the machine direction length of discrete element 50. During the portion of the sequence shown in FIGS. 7 and 8, it is preferable that V2 equals V3, namely that the manifold shaft 14 and the porous roll 12 are rotating in the same direction at the same speed.

Figure 9:
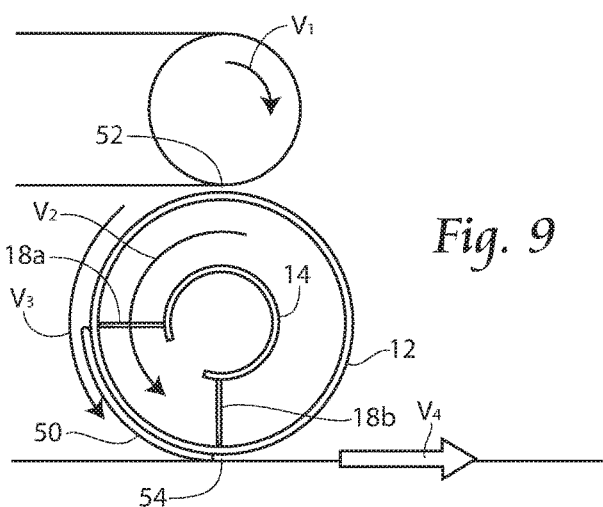

Referring to FIG. 9, as the leading edge of discrete element 50 reaches deposition point 54, rotation of the manifold shaft 14 stops, or V2 goes to zero, while porous roll 12 continues to rotate at V3. At this point, a handoff sequence begins, where control over discrete element 50 is handed off to a secondary operation 60 moving discrete element 50 at V4, secondary operation 60 for exemplary purposes comprising depositing the discrete element. 50 to be transported onto a carrier web, or onto a vacuum conveyor, to a bonder, to an additional system 10 comprising a porous roll 12 and internal independently rotatable vacuum manifold 14, a bonding unit, or otherwise.

Though not necessary, if desired to assist handoff, in an alternate embodiment (not shown) a blow-off system can be incorporated to operate with the commutating manifold 16 to positively push air through the pores 24 of porous roll 12. To implement a blow-off system, a rotary union can be used to attaching a blow off to the manifold (or even integrating it into the internal manifold itself). In another embodiment (not shown), a blowoff could assist to clear the pores 24 of porous rolls 12 of debris (such as material fibers) should debris accumulate in the pores 24.

Figure 10:
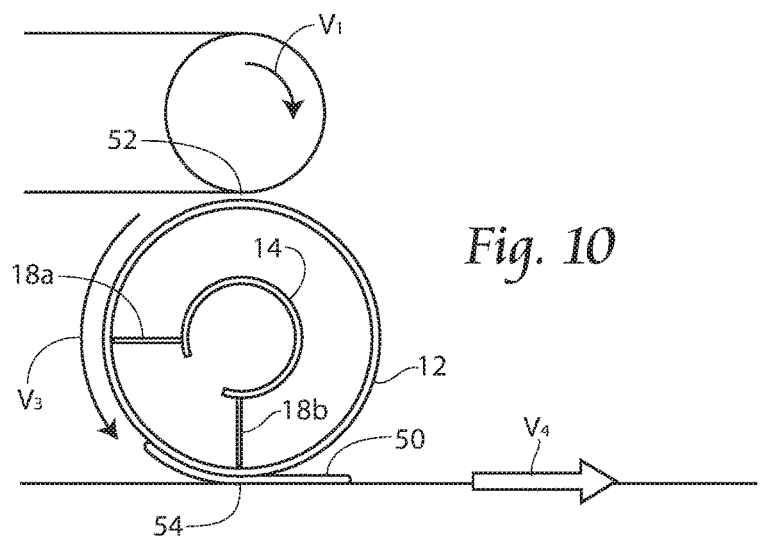
Figure 11:
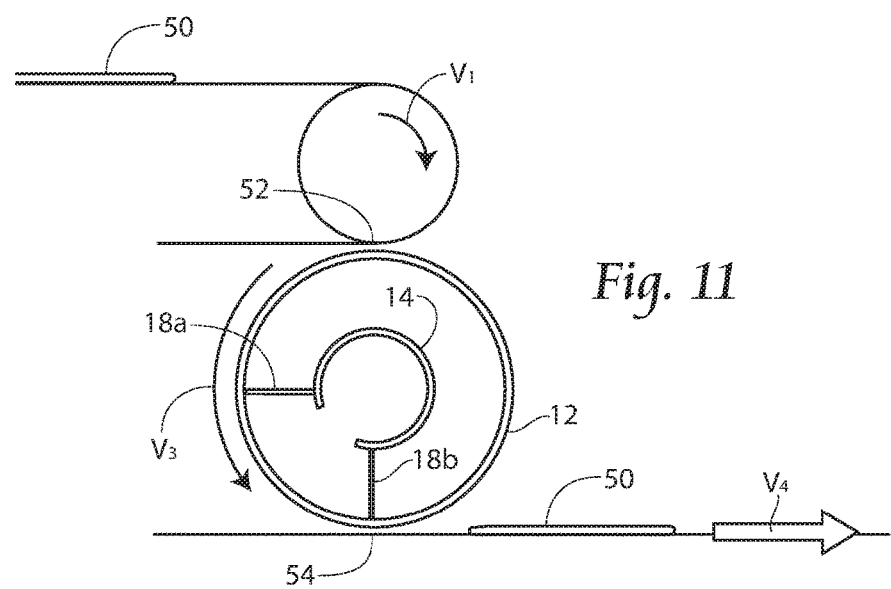
Figure 12:
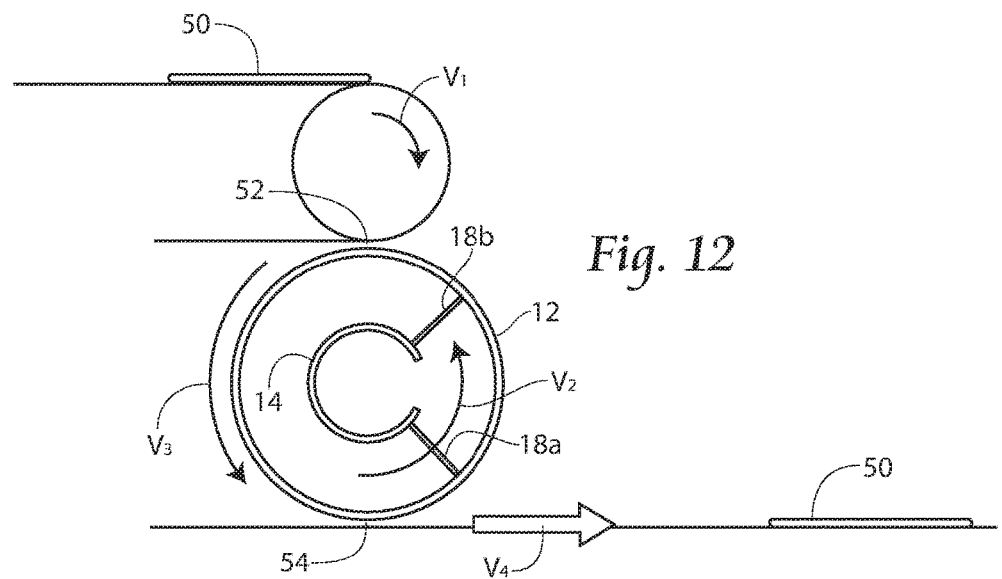
Figure 13:
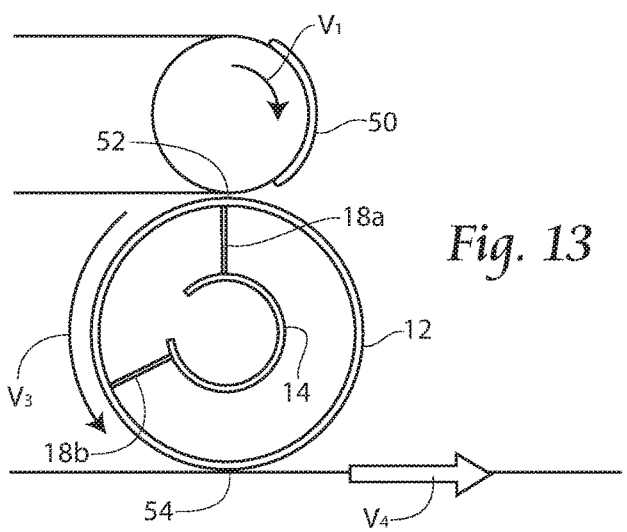

Referring to FIG. 10, as the handoff sequence of control over discrete element 50 continues, V2 remains at zero, while V3 remains constant. Referring to FIG. 11, handoff of discrete element 50 to secondary operation 60 is complete. Referring to FIG. 12, the handoff sequence has concluded and V2 accelerates from zero to a speed greater than zero, in order to return trailing edge 18 to acquisition point 52, as shown in FIG. 13.

In another aspect of the invention, the drums and vacuum chambers have variable motion profiles. Because of the variable motion profiles, it is possible to accelerate or decelerate the speed of the unit to change the spacing between the discrete elements being transported. Several motion profiles of V1, V2, V3 and V4 relative to one another are possible. Such a motion profile could be: for trailing edge 18a to wait at material pickup location 52 (V2 is zero), next when portion of discrete element finishes acquisition at point 52, V2 increases; and the V2 is matched with V3, also the speed of discrete element 50, and then for V2 to exceed V3 on approach to deposition point 54 to allows time to slow manifold 14 without losing vacuum on the leading edge of the patch or to accelerate the speed of the patch to V4 in the case where V4 is greater than V3; next to reduce V2 to zero at deposition point 54; next to repeat the sequence.

It is possible to use multiple internal vacuum application zones 16 by creating additional walls 18a and 18b, connecting through a void space in shaft 14.

It is also possible for V2 to be in the opposite direction as V3, if desired for control in a preferred motion profile.

Figure 14:
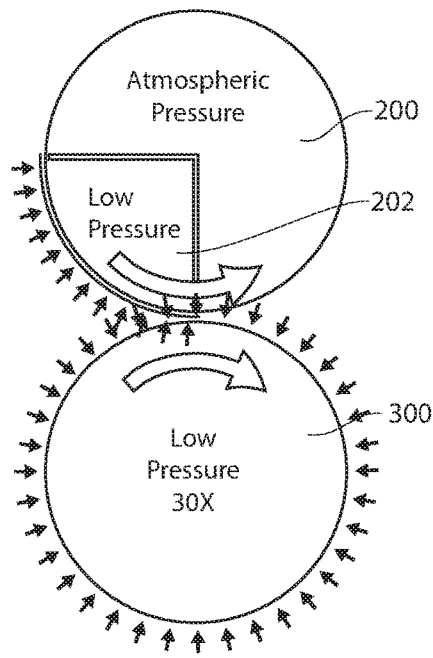
FIG. 14 is a demonstrative side view of rotating bodies and air flow patterns.

In an exemplary embodiment of a system that uses vacuum to hold a discrete element to the surface of a rotating drum, all of the air that flows from atmosphere into the pores of the drum would be oriented such that the direction of the airflow would be perpendicular to the surface of the drum. Any airflow in the cross machine direction or machine direction of the system has the potential to create forces on the edges of the discrete element which can cause the discrete element to fold back upon itself. (The discrete element is most susceptible to have edge folding occur as the discrete element transfers between drums.) Referring now to FIG. 14, a demonstrative side view of rotating bodies 200 and 300 and air flow patterns is shown. Upstream of the tangent between the two rolls 200 and 300, air into the low pressure zones 202 of the upper drum 200 travels from atmosphere and 30× of the lower drum 300. If the distance between the surfaces of the drums is adequately large, air can flow from the atmosphere surrounding the drums in a direction approximating perpendicular to the drum surfaces. However, if the distance between the drum surfaces is reduced incrementally, a distance will be reached where there is not adequate space between the drums to enable the air to flow in the optimum direction. As the distance between the rolls is further reduced, the direction of the airflow into the drum surfaces becomes less perpendicular to the drum surfaces and the potential for discrete element fold over increases. Atmospheric air can enter the system from the upstream side of tangent point of the drums 200 and 300, and some air can rush downstream from the higher pressure zone towards the downstream side of the transfer point (not shown). Because so much air is drawn in to create the low pressure zone in prior art vacuum system design, air velocity can undesirably cause patches carried by the drum (not shown) to behave erratically, and lead to flipping over of leading, trailing, or side edges. It has been found that even a small change in the air conditions at the transfer point can create imperfections and unrepeatability. To solve this problem, the system of the present invention limits the amount of airflow in the zone on the upstream side of the tangent part of the rolls 200 and 300, so the system does not undesirably reduce pressure, causing air to inrush. Because the bottom drum 300 of the present invention is supplied at least in part at atmospheric pressure, air can flow from the interior region of the bottom drum 300 to satisfy the need for air in the low pressure area 202 of the top drum 200.

Figure 15:
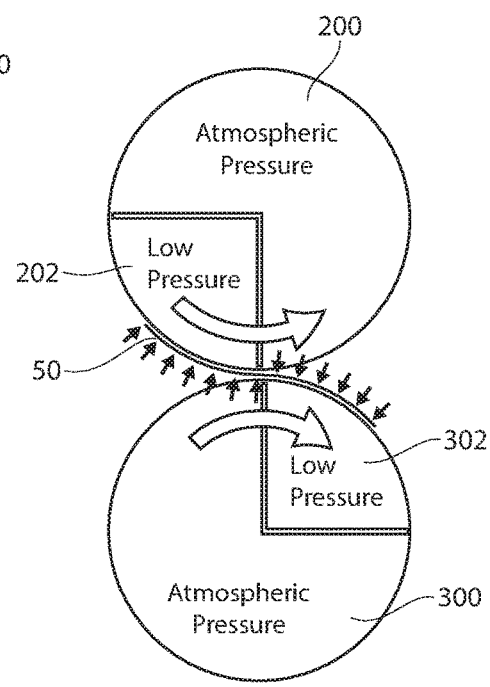
FIG. 15 is a demonstrative side view of rotating bodies and air flow patterns.

FIG. 15 is a demonstrative side view of rotating bodies 200 and 300 and air flow patterns, with this configuration showing two low pressure zones 202 and 302, one in each of the top and bottom rotating drums 200 and 300 respectively. A patch 50 is shown being transferred from the top drum 200 to the bottom drum 300, but it is understood that in an operating system, the handoff of the patch 50 is going to be upstream handoff to a downstream unit in the machine direction.

To optimize the air flow of the system and minimize undesirable air flow patterns, it has been found advantageous to avoid locating low pressure zones 202 and 302 opposite of one another in a rotating system. Avoiding adjacent low pressure zones allows atmospheric air to flow into the low pressure zones 202 and 302 as intended, without undesirable turbulence that could be transmitted to the carried web or patch.

As shown in FIG. 15, low pressure zone 202 on the top drum 200 leads up to the tangent point, between the top drum 200 and bottom drum 300, and a low pressure zone 302 trails the tangent point on the bottom roll 300. It has been found that this configuration minimizes the undesirable inrush of air from the upstream side of the tangent point. Downstream of the tangent point, the interior (center) of the top drum 200 is exposed to atmospheric pressure, and this zone assists to satisfy air demand into the low pressure zone 302 of the bottom drum 300. Conversely, upstream of the tangent point, the interior (center) of the bottom drum 300 is exposed to atmospheric pressure, and this zone assists to satisfy air demand into the low pressure zone 202 of the top drum 200. The general principle is that it has been found advantageous in material handling to avoid low pressure zones opposite of one another while handling a web or a patch 50.

Figure 16:
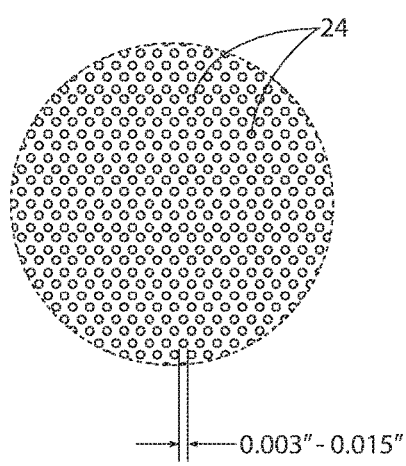
FIG. 16 is a close-up view of one pattern of micro vacuum commutation ports.

FIG. 16 is a close-up view of one pattern of micro vacuum commutation ports 24. In some systems, drums or other carrying structures (such as pucks) have vacuum commutation ports that have sparsely spaced port configurations, with the ports sometimes spaced around the perimeter of a discrete patch of material (or continuous webs) to be carried by the structure. In the present invention, micro vacuum commutation ports 24 can be used. These micro vacuum commutation ports 24 can have a pattern density more evenly distributed across the entire surface of the patch (in contrast to around the periphery). Because the system of the present invention can use less air (and energy, and in turn create less noise), a smaller amount of airflow is required to be generated by the vacuum system. In the present invention, a smaller hole diameter (for example, on the order of 0.003"-0.015") can generate the holding force necessary to hold webs commonly used in the manufacturing process, such as non-woven webs. Such hole diameters result in a surface area of a representative void space of between about $7 \times 10^{-6}$ square inches and $1.8 \times 10^{-4}$ square inches each. This pore size has been discovered to be advantageous to securely hold individual fibers of a typical nonwoven of a denier of less than 1, to approximately 20 denier, and in some preferred nonwovens, 10-60 μm diameter; however other nonwovens have 0.1 μm diameter-300 μm diameter. Typical nonwoven construction comprises many tiny bond points to which connect individual fibers of the essentially random fiber orientation. The microporous structures described above advantageously align with a holding force effective amount of these bond points in nonwoven to provide secure control over nonwovens.

A porous structure, such as drums 200, 300, or any of the disclosed pucks, can be provided with micro vacuum commutation ports 24 to, preferably: 1) reduce airflow requirements in the system; 2) provide more complete sealing of the pores and thereby increase holding forces on the discrete article; 3) minimize "dead zones" or areas with no inward air flow, between pores to minimize the potential for discrete article edge flip backs.

Such small micro vacuum commutation ports 24 can be manufactured for instance by electron drilling techniques, chemically etched, or drilled on thin foil. The thin foil construction, if used, is preferably supported by an underlying support structure for providing rigidity to the surface of the puck or drum. These techniques can require fairly thin gauge metal to be used in construction of the article carrying surfaces, resulting in a mask type structure which may be used over a full vacuum zone to limit inertia. In this embodiment, an air-permeable cylinder wall, or a buildup of air-permeable support structure could be covered by a micro-pore screen containing micro vacuum commutation ports 24. Such a mask type structure could be desired for instance, in high speed applications, to reduce inertia.

Non-woven material commonly used in disposable product manufacturing (e.g., diapers, feminine hygiene products) has individual fiber diameters of in the range of approximately 0.005". In the prior art vacuum commutation port designs, a port of, for instance, ⅛" diameter (which can be less or more) causes air to flow around the fibers of the nonwoven, and through the nonwoven generally. The holding force of vacuum commutation ports of the prior art is referred to as vacuum, though the holding force is more wind resistance applied to the nonwoven than true vacuum. In the present invention, micro vacuum commutation ports 24, which are near in size or smaller than the fibers of the nonwoven causes the micro vacuum commutation ports covered by an individual fiber of the nonwoven to be sealed off partially or completely. The micro vacuum commutation port 24 arrangement of the present invention does not rely as much, if at all, on air flow or wind resistance like the prior art, but instead on a static pressure differential.

The micro vacuum commutation ports 24 of the present invention are not necessarily as small as individual fibers, although such small ports 24 are useful and within the scope of the present invention. For instance, spunbond nonwoven has overlapping individual fibers, which can be embossed and bonded to one another. The micro vacuum commutation ports 24 of the present invention can be sized smaller than the bond patters of the spunbond nonwovens. By using micro vacuum commutation ports 24 of the present invention, it has been found that it is not necessary to engage each fiber, or each bond between fibers, and it is likewise not necessary that each micro vacuum commutation port have an overlying fiber. Sufficient holding force can be generated by the micro vacuum commutation ports 24 if, for any given discrete portion of a web, or a segment of a continuous web, a fraction of the fibers are coupled with a fraction of the micro vacuum commutation ports 24 in the targeted area to be carried and controlled (e.g., transferred, deposited).

Regarding density of the micro vacuum commutation ports 24 on a given structure, micro vacuum commutation ports 24 can be configured to comprise between 5%-50% of the surface area of the carrying structure (e.g., puck or drum). This range of surface area has been found to first, provide sufficient vacuum holding force; yet second, to retain enough strength for durable operation.

One additional benefit of the micro vacuum commutation port structure 24 is that the article carrying structure is less prone to contamination from pulp fiber and dust, because the micro vacuum commutation port structure is so small that it is difficult for contaminants to enter the structure.

Figure 17:
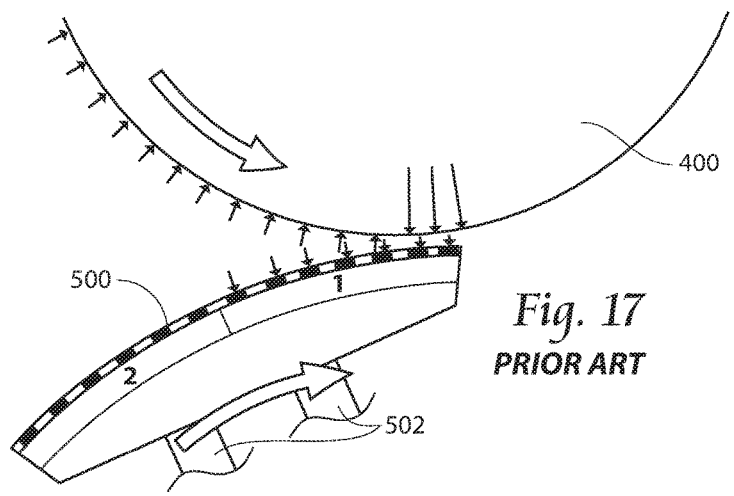
FIG. 17 is a side view of a puck structure.

Referring now to FIG. 17 is a side view of a prior art puck structure 500 is shown.

In the configuration exemplified by FIG. 17, ambient air leaves a low pressure zone upstream of the tangent between puck 500 and rotating drum 400. Because surfaces of both puck 500 and drum 400 are open to a vacuum chamber, this results in a low pressure zone between surfaces, which undesirably causes air to inrush from the sides and ends of the surfaces. The ambient air inrush from between where air is drawn into drum 400, and where air is drawn into puck 500 can disturb a patch on a drum 400 or puck or being as the patch is transferred. In the current system, at the moment of transfer, and at the transfer point, a transfer assist sequence (shown in arrows leaving the interior of drum 400) assists patch or web transfer from drum 400 onto puck 500 (or off of a puck as the case may be) by using a blast of pressurized air at that specific location (the transfer point) to blow the patch off the drum 500 and onto the puck 400 receiving the patch. The pressurized air from drum 400 can undesirably blow into the puck 500, and the extra air movement challenges the efficacy of the transfer or patch handoff.

In some prior art puck systems, two zones 1 and 2 are created at the puck surface, so that vacuum to these zones 1 and 2 can be independently controlled. Zone 1 can have applied vacuum while zone 2 has no applied vacuum. Alternatively, zone 2 can have applied vacuum while zone 1 has no applied vacuum. The on/off sequence is principally dictated by whether the puck 500 is receiving a patch or handing off a patch. It is desirable in certain handoff or receiving operations to, at a leading edge of the puck 500 in zone 1, apply vacuum to receive the leading edge of the received patch. But when it comes time to hand off the patch to the next equipment downstream, it is desirable to turn vacuum off of zone 1 to hand the patch off and relinquish control of the patch to the next piece of equipment, while retaining the patch with vacuum applied in zone 2. The desired blowoff to assist patch handoff can undesirably minimize the vacuum present in the puck 500 in zone 1 at that point.

In conventional vacuum puck designs, the pucks have cross machine direction air chambers that are connected to the surface of the puck 500. As the puck 500 travels, the air chambers move between high and low pressure zones of a vacuum manifold, and this results in air flowing into or out of the surface of the puck 500. This airflow and the associated pressure differentials will either cause a material patch to be attracted or repelled from the puck surface 500.

Still referring to FIG. 17, one shortcoming of the prior art is that ports 502 which commute vacuum to puck 500 are located remotely from the puck 500. The control for turning vacuum on or off at zones 1 and 2 is therefore remote from the puck 500. This remote arrangement undesirably creates lag time for high speed switching of vacuum on and off in zones 1 and 2. Because some of the turner pucks of the prior art, for instance those disclosed in U.S. Pat. No. 8,172,977 (incorporated by reference), rotate both in the machine direction and cross machine direction at the same time, it is impractical to use a conventional combination of a side vacuum manifold aligning with cross machine direction air chambers. Therefore, the air passages between the puck 500 and the vacuum chamber are routed through the center of the pucks 500. This results in relatively long airflow passage ways between the surface of the puck 500 and the vacuum supply manifold (not shown). This restricts the speed at which the direction of airflow at the surface of the puck 500 can be reversed. The remoteness of the vacuum manifold from the puck 500 is difficult to implement with pucks with multiple discrete zones that require quick changes in airflow direction.

Figure 18:
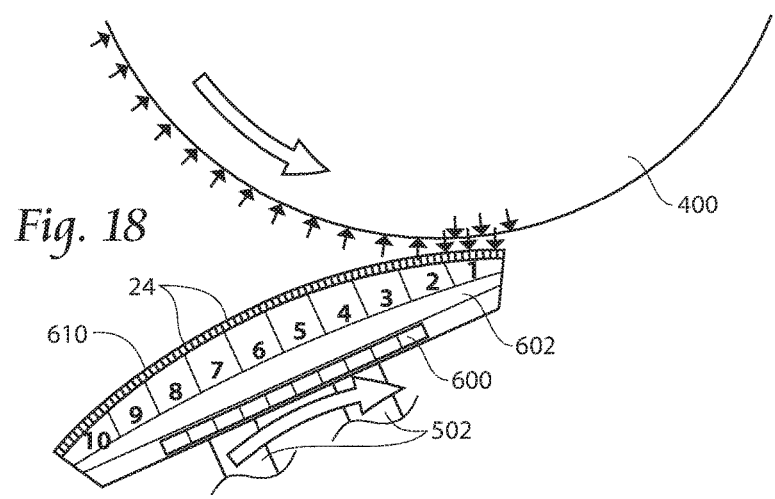
FIG. 18 is a side view of a puck structure with micro vacuum commutation ports and valved and zoned vacuum commutation porting.

Referring still to FIG. 18, a side view of a puck structure 610 with micro vacuum commutation ports 24 and valved and zoned vacuum commutation porting is shown. As with the example shown in FIG. 15 of two adjacent vacuum rolls that transfer a patch of material from one roll to the other roll, the same airflow and micro-perforated surface improvements can be made to a system that replaces one or both of the full rolls with vacuum pucks 610 that behave as partial rolls.

Instead of two zones 1 and 2 of the system shown in FIG. 17, the puck 610 of FIG. 18 can be made with multiple zones, 1'-10' or more or less for instance. Zones 1'-10' can either be open to the vacuum chamber (not shown) through ports 502 or open to the atmosphere. With the segmented vacuum zone 1-10 configuration on the puck 610, the system requires far less (if any) blow off pressure from the drum 400. As the puck 610 passes the tangential point, each of the zones 1-10 are selectively turned on in an acquisition sequence, in order to gain control of the patch as the puck 610 rolls past the drum 400.

A rotating valve disk 600 is used to rapidly control the application of vacuum air to each individual zone 1-10 in a controlled way. By sequential vacuum engagement, the undesirable low pressure zone at the transfer point between drum 400 and 610 is minimized if not eliminated, and there is therefore less turbulence or disruption of a carried patch at that point. Incorporating a valve mechanism 600 that can quickly switch airflow passages between a vacuum supply chamber and atmosphere in the puck 610 reduces the level of the air passage lengths to a level that will enable adequately rapid response. This allows for on/off times of zones 1'-10' to be nearly instantaneously controlled because of the proximity between the vacuum commutation and the vacuum surface of the puck 610. This proximity also enables a rotating puck 610 to have multiple air flow zones 1-10 which can be controlled to switch the airflow direction at the surface of the puck 610. By using multiple zones 1-10, airflow at the surface of the puck 610 can be optimized to closely approximate the airflow characteristics of a two roll system shown in FIG. 15.

By locating the rotating valve disk 600 or other form of vacuum control inside of the puck 610 assembly itself or in close proximity to the puck, this puts the mode of control into the puck 610, and minimizes lag time for on/off operations. Zone control in the puck 610 is adjacent to the puck surface.

Still referring to FIG. 18, internal air passages 602 from valve disk 600 are used commute vacuum from ports 502 to the surface of puck 610.

Drum 400 displays a transition position where air flow direction switches from inward (arrows pointing into drum 400) to outward (arrows pointing out of drum 400). In a preferred embodiment, this transition position is offset either upstream or downstream of the discrete article transfer (handoff by acquisition or deposition) positions by a selected amount, to compensate for variations in the system.

Sill referring to FIG. 18, the rotatably driven multi-zoned vacuum puck 610 used to turn discrete articles 180 degrees and transport them from a pickup position (where for example a leading edge or zone 1' of puck 610 first begins acquisition of discrete articles, see, e.g., acquisition point 52 of FIG. 1) to a deposition position (where for example discrete articles are laid down on a running web, see, e.g., deposition point 54 of FIG. 1). The repositioning of articles shown for example in FIGS. 5-17 of U.S. Pat. No. 8,016,972, incorporated herein by reference. An external vacuum manifold (not shown) applies vacuum through internal vacuum passages to zones 1'-10' in the puck as previously described when the zones 1'-10' are located in positions between just upstream of the acquisition position, to the downstream side of the acquisition position, and the upstream side of the deposition position. When a vacuum passage 1'-10' is engaged with the vacuum manifold, ambient air flows into the pores on the surface of the puck 610 in order to hold material against the puck's external surface. Conversely, when a vacuum passage 1'-10' is not engaged with the vacuum manifold, ambient air flows can flow out of the pores 24 on the surface of the puck 610.

To accomplish this, the vacuum puck 610 rotates such that the surface of the puck 610 is traveling at the same speed as the incoming discrete element carried by drum 400. The external vacuum manifold is positioned such that ambient air flows outward through the surface of the puck 610 at points immediately upstream of the acquisition point and ambient air flows inward through the pores in the surface of the puck 610 at points immediately downstream of the pick-up point. As the leading edge of the discrete article reaches the acquisition point, air flowing from the atmosphere into the vacuum puck 610 forces the leading edge of the discrete article to transfer to and be held against the surface of the puck 610. Likewise, the remainder of the discrete article will transfer onto the porous roll or puck 610 as the porous roll or puck 610 advances.

After the trailing edge of the discrete article is transferred to the surface of the vacuum puck 610, the puck continues to rotate and thereby transports the discrete article to the deposition point. The vacuum applied external vacuum manifold ends immediately upstream of the deposition point such that ambient air flows into the puck 610 upstream of the deposition point and ambient air flows out of the puck 610 downstream of the deposition point. As the leading edge of the discrete article passes the deposition point, air flowing out of the puck 610 and into the vacuum zone of the receiving device forces the discrete article to transfer from the surface of the porous roll onto the receiving device. Likewise, the remainder of the discrete article transfers onto the receiving device as the discrete article continues to advance. After the discrete article has transferred to the receiving device, the vacuum puck returns to its original orientation and position upstream of the pickup point and the cycle repeats.

Likewise, the remainder of the discrete article transfers onto the receiving device as the discrete article continues to advance. After the discrete article has transferred to the receiving device, the vacuum puck returns to its original orientation and position upstream of the pickup point and the cycle repeats. In such a puck system, ambient air can flow from the inside of the puck outward to: 1) eliminate or minimize overlapping low pressure zones which in turn eliminates or minimizes in-rushes of air at the edges of the patch; 2) results in an airflow direction that is approximately perpendicular to the surface to which the discrete element is riding upon. Such a puck system also can utilize micro-pores to: 1) reduce airflow requirements; 2) provide more complete sealing of the pores and thereby increases holding force on the discrete article; and 3) minimize dead zones between pores to minimize the potential for discrete article edge flip backs.

Figure 19:
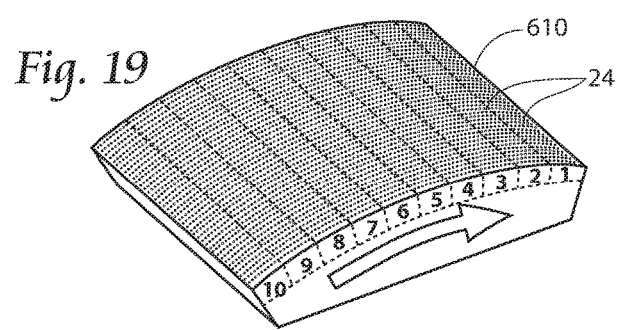
FIG. 19 is a perspective view of a puck for carrying discrete portions of a web, the puck with micro vacuum commutation ports and valved and zoned vacuum commutation porting.
Figure 20:
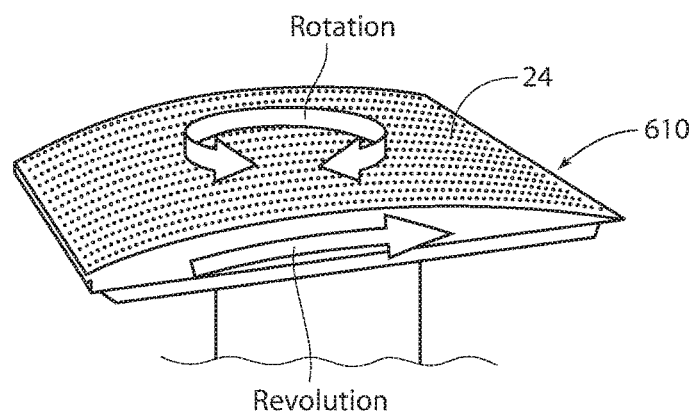
FIG. 20 is a top perspective view of a puck with the capability of both rotation and revolution.

Referring now to FIG. 19, a perspective view of puck 610 is shown. Puck 610 is advantageously equipped with micro vacuum commutation ports 24, which commute vacuum, for instance by the arrangement shown in FIG. 18.

Referring now to gig. 20, an exemplary puck 610 is shown with the capability of both rotation and revolution, as previously described.

FIGS. 21A-21F display a side view of a sequence of operation of an anvil 900/drum 902 feeding discrete pieces 50A, 50B to a series of porous roll/internal vacuum manifold combinations 10/12/14A and 10/12/14B positioned about the drum 902 for passing and spacing discrete pieces 50A and 50B to a running web 60. Porous roll/internal vacuum manifold combinations 10/12/14 are preferably operable as described previously, with manifold 14 rotating independently of roll 12, allowing the rotational velocities of each to vary from one another (V2 for manifold 14, and V3 for roll 12) and create unique operational sequences. One such unique sequence is the operation displayed in FIGS. 21A-21F.

Figure 21A:
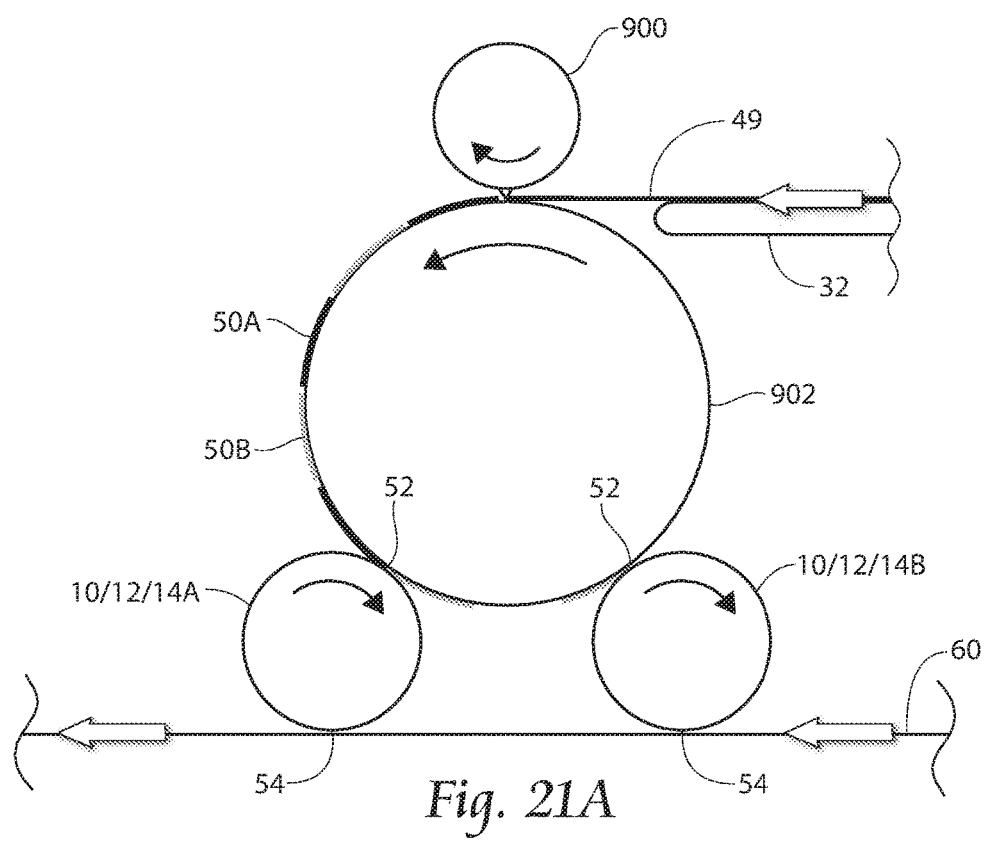
FIGS. 21A-21F display a side view of a sequence of operation of an anvil/drum feeding discrete pieces to a series of porous roll/internal vacuum manifold combinations positioned about the drum for passing and spacing discrete pieces to a running web.

Referring first to FIG. 21A, an incoming web 49 is carried by a conveyor 30 to an anvil 900/drum 902 combination. Incoming web 49 is severed into sequential alternating discrete pieces 50a, and 50 B, and this operation can be a slip/cut technique as is known in the art.

Figure 21B:
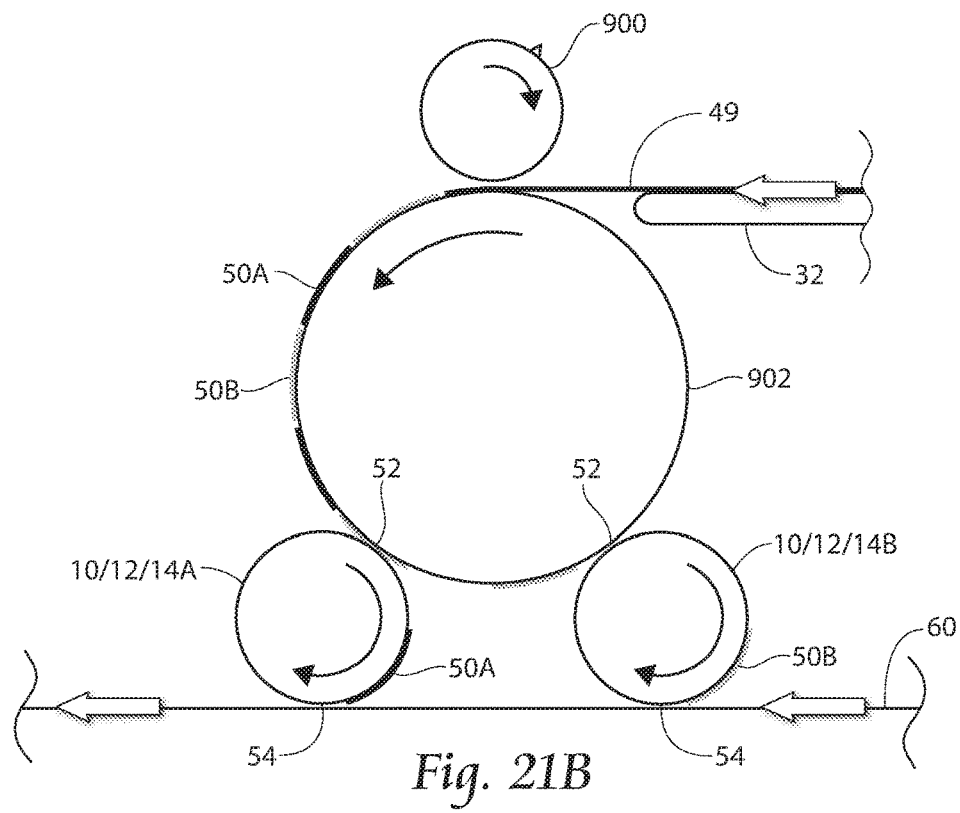
Figure 21C:
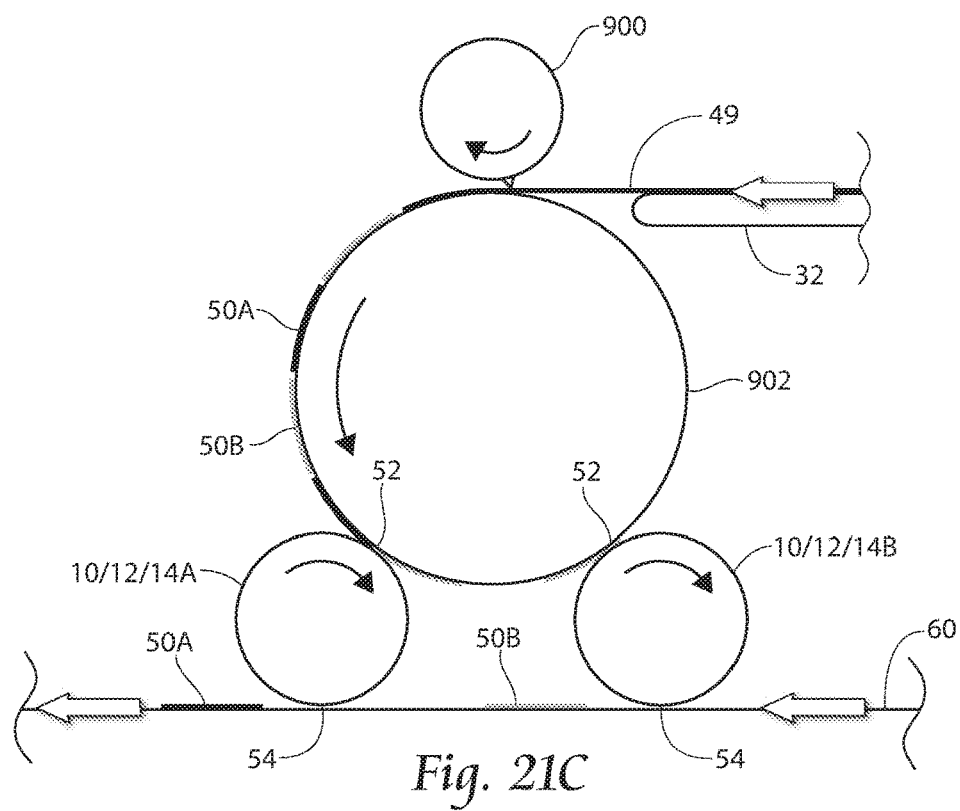
Figure 21D:
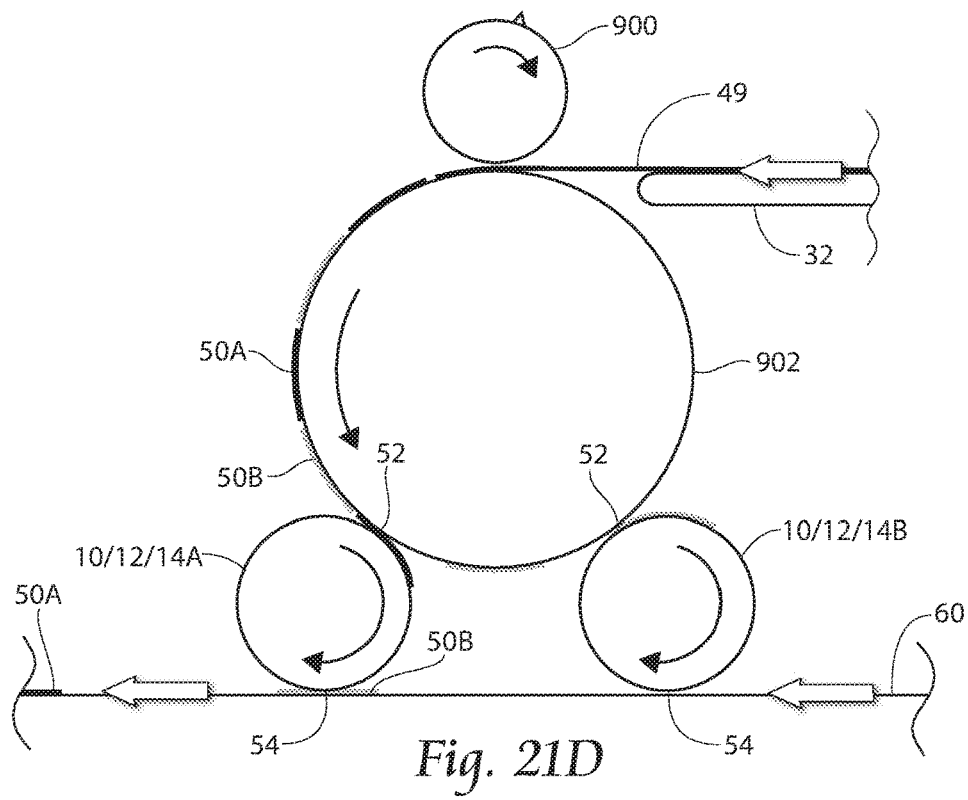

In one embodiment, porous roll/internal vacuum manifold combinations 10/12/14A and 10/12/14B are positioned about drum 902. In the illustrated embodiment, two porous roll/internal vacuum manifold combinations 10/12/14A and 10/12/14B are used, although more or less could be deployed depending on the desired operational sequence. A first porous roll/internal vacuum manifold combination 10/12/14A is positioned upstream of a second porous roll/internal vacuum manifold combinations 10/12/14B. The first porous roll/internal vacuum manifold combination 10/12/14A is positioned and operated to pick up every other of the discrete pieces 50A and 50 B, the first combination picking up discrete pieces 50A leaving behind discrete pieces 50B for the second porous roll/internal vacuum manifold combination 10/12/14B to acquire, accelerate and deposit. Preferably simultaneously, each of the porous roll/internal vacuum manifold combinations 10/12/14A and 10/12/14B acquire discrete pieces 50A and 50B, respectively at their own acquisition points 52, as shown in FIG. 21B.

Figure 21E:
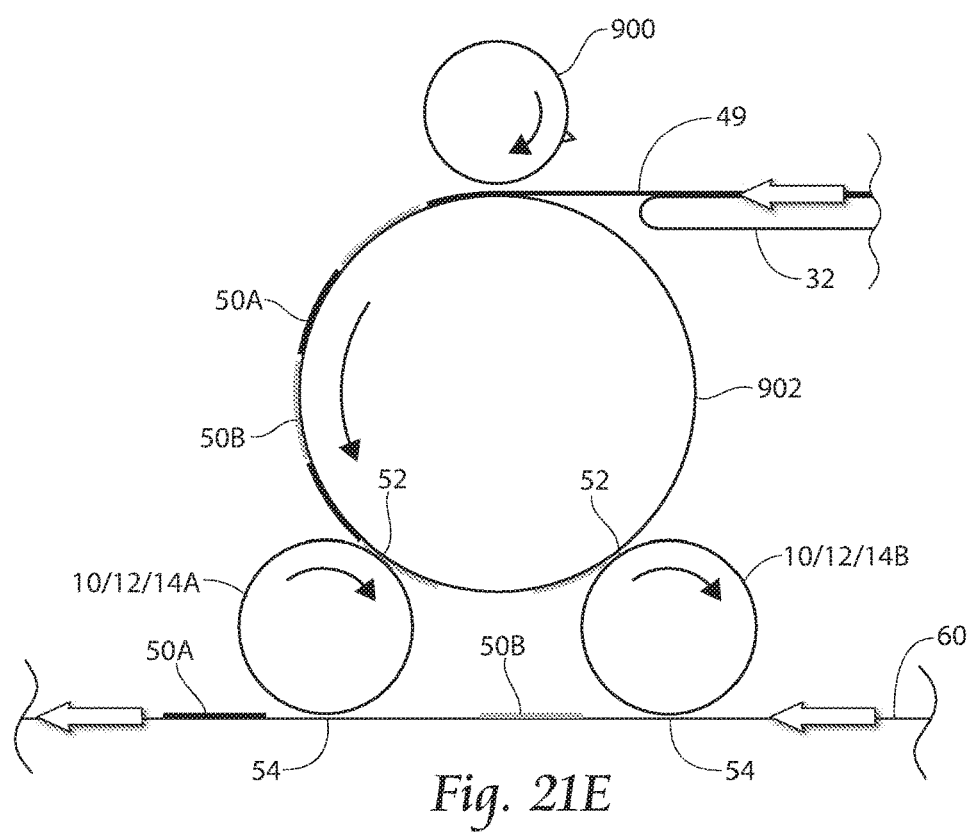
Figure 21F:
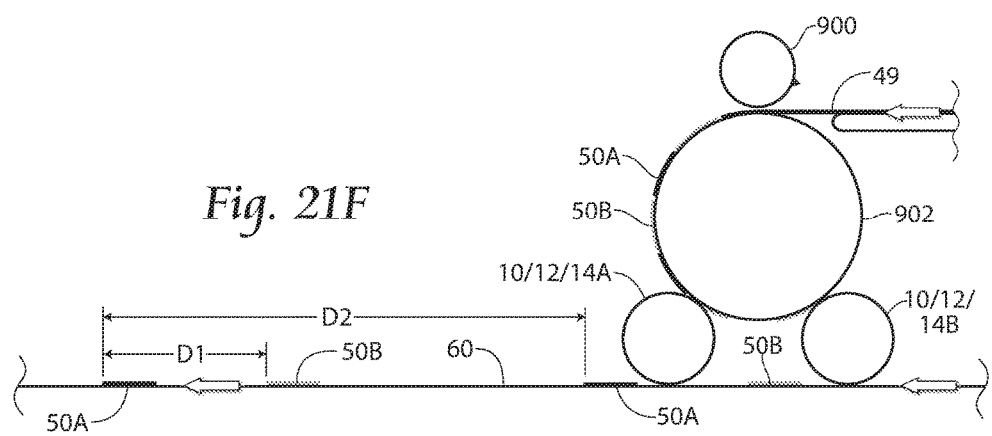

Both porous roll/internal vacuum manifold combinations 10/12/14A and 10/12/14B then accelerate discrete pieces 50A and 50B, respectively to their deposition points 54. At deposition points 54, discrete pieces 50A and 50B are deposited onto an incoming web 60 as shown in FIG. 21E, and the incoming web can come into contact with discrete pieces 50A and 50B by either a close-gap spacing arrangement between porous roll/internal vacuum manifold combinations 10/12/14A and 10/12/14B and the web, or a bump method such as disclosed in U.S. Pat. No. 7,811,403 incorporated herein by reference. Alternatively, a nip point underneath deposition points 54 could be ultrasonic bonding stations (not shown), which could then bond discrete pieces 50A and 50B to traveling web 60 simultaneously with deposition. This sequence allows for discrete pieces 50A and 50B to be deposited onto running web 60 at a first spacing D1 between pieces 50A and 50B, and allows for a second spacing D2, preferably product pitch, between two pieces 50A in a sequence and spacing D2 also between two pieces 50B in a sequence. D1 and D2 can also be arranged so that D2 is twice D1. The web as shown in FIG. 22 can then be severed into individual products at several locations, either through pieces 50A and/or 50B, or between any of 50A and 50B, as desired.

Figure 22:
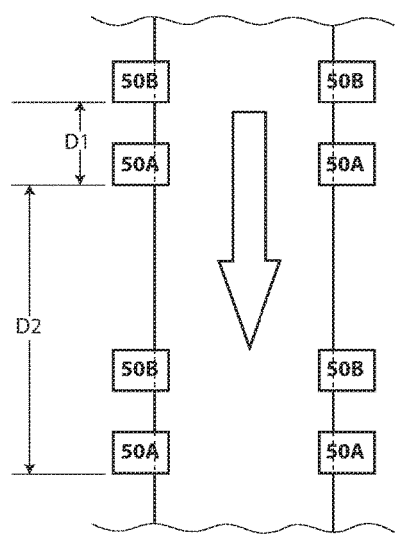
FIG. 22 is a top perspective view of an exemplary placement sequence of discrete pieces about sides of a running web.
Figure 23:
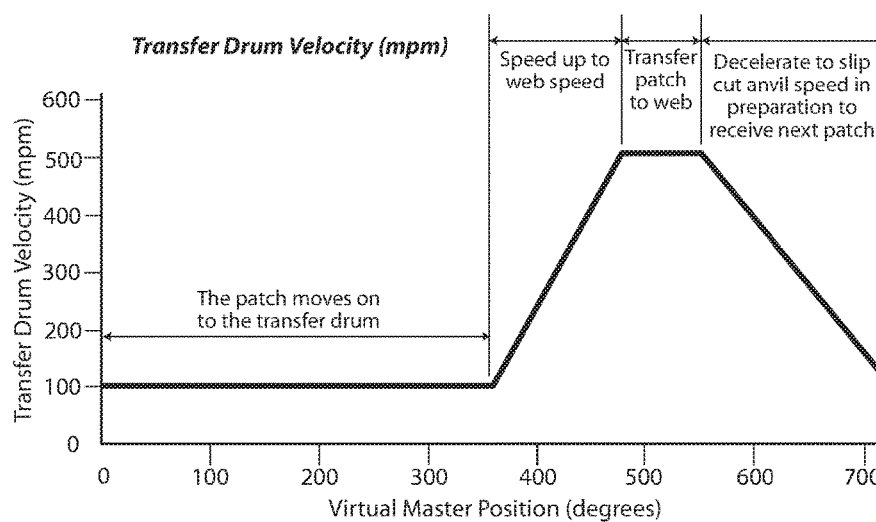
FIG. 23 is an exemplary transfer drum velocity speed profile for a series of porous rolls and internal vacuum manifolds during an acquisition and deposition sequence.

As shown in FIG. 22, a top perspective view of an exemplary placement sequence of discrete pieces 50A and 50B about sides of a running web 60, a pair of discrete pieces 50A, and a pair of discrete pieces 50B can be deposited at the same placement in a machine direction, for instance in placement of ear tabs or other discrete components about a chassis web 60 of a diaper. Products as shown in FIG. 22 can then be severed in the cross machine direction, either between To accomplish a D1/D2 placement of discrete pieces 50A and 50B as shown in FIG. 22, FIG. 23 shows an exemplary transfer drum velocity speed profile for porous roll/Internal vacuum manifold combinations 10/12/14A and 10/12/14B during an acquisition and deposition sequence. Although FIG. 23 displays an exemplary transfer drum velocity speed profile for porous roll/internal vacuum manifold combinations 10/12/14A and 10/12/14B, actual speeds can vary higher or lower than those displayed. As can be seen, referring to FIG. 23 as well as the sequence depicted in FIGS. 21A-21F, during a period of acquisition of an individual patch 50, the transfer drum moves at a constant velocity, preferably the same velocity as the drum 902. During this period, referring for example to V1 (representing in this embodiment the velocity of drum 902), V2 (representing in this embodiment the velocity of manifold 14), V3 (representing in this embodiment the velocity of porous roll 12), and V4 (representing in this embodiment the velocity of web 60) of FIG. 6, V1=V2=V3<V4. At the completion of patch 50 acquisition by one of the porous roll/internal vacuum manifold combinations 10/12/14A and 10/12/14B, the porous roll/internal vacuum manifold combination 10/12/14 accelerates to equal V4 of the running web 60, until a deposition period of deposition of patch 50 to web 60, when V1<V2=V3=V4. Next, in preparation for acquisition of the next patch 50 in sequence, porous roll/internal vacuum manifold combinations 10/12/14A and 10/12/14B decelerate back to equal V1. The process then repeats.

As multiple porous roll/internal vacuum manifold combinations 10/12/14A and 10/12/14B work in conjunction, each porous roll/internal vacuum manifold combinations 10/12/14A and 10/12/14B processing every other discrete article 50A or 50B in a continuous stream of discrete articles 50 to change the spacing between discrete articles 50A and 50B, or successive discrete articles 50A, by large amounts such as a 5:1 spacing increase. In this manner, at least two spacings, D1 and D2, can be achieved between successive pieces.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A system for processing a web, the system comprising:
a rotating vacuum commutation structure;
a rotating article carrying surface for receiving at least a portion of a traveling web;
said rotating vacuum commutation structure communicatively coupled to a first portion of said rotating article carrying- surface;
said rotating vacuum commutation structure movably communicatively coupled between said first portion of said rotating article carrying surface to a second portion of said rotating article carrying surface, said at least said portion of said traveling web traveling at a first speed, said rotating article carrying surface for receiving at least said portion of said traveling web traveling at said first speed, and said rotating vacuum commutation structure traveling at a speed variable from less than first speed, to said first speed, to greater than said first speed.

2. A system for processing a web, the system comprising:
a rotating external porous roll rotating at a first rotational speed;
a rotating internal vacuum manifold communicatively coupled with at least a portion of said rotating external porous roll, said rotating internal vacuum manifold rotating at a variable rotational speed, from a second speed less than said first rotational speed, to said first rotational speed, to a third speed greater than said first rotational speed.

3. A system for processing a web according to claim 2, the system further comprising:
a discrete portion of said web carried by said rotating external porous roll from an acquisition point a deposition point.

4. A system for processing a web according to claim 3, the system further comprising:
a leading and a trailing wall of said internal vacuum manifold to define a machine direction zone of vacuum commutation;
said discrete portion of said web having a leading edge and a trailing edge, said discrete portion of said web introduced to said rotating external porous roll at a speed matched to said first rotational speed,
said trading wall traveling at said second speed less than said first rotational speed when positioned proximally downstream of said acquisition point, said machine direction zone of vacuum commutation causing said discrete portion of said web to be sequentially carried by said rotating external porous roll as said rotating external porous roll advances,
said internal vacuum manifold accelerating to said first rotational speed as said trailing edge is carried by said rotating external porous roll, and said internal vacuum manifold decelerating to said second rotational speed as said leading wall of said internal vacuum manifold approaches said deposition point, said discrete portion of said web sequentially transferred from said rotating external porous roll to a receiving surface.

* * * * *